(12) United States Patent
Lye et al.

(10) Patent No.: US 11,928,752 B1
(45) Date of Patent: Mar. 12, 2024

(54) ALLOCATION OF DYNAMICALLY BATCHED SERVICE PROVIDERS AND SERVICE REQUESTERS

(71) Applicant: GRABTAXI HOLDINGS PTE. LTD., Singapore (SG)

(72) Inventors: Kong-Wei Lye, Singapore (SG); Yang Cao, Singapore (SG); Swara Desai, Singapore (SG); Chen Liang, Singapore (SG); Xiaojia Mu, Singapore (SG); Yuliang Shen, Singapore (SG); Sien Y. Tan, Singapore (SG); Muchen Tang, Singapore (SG); Renrong Weng, Singapore (SG); Chang Zhao, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/949,342

(22) Filed: Sep. 21, 2022

Related U.S. Application Data

(63) Continuation of application No. 16/612,131, filed as application No. PCT/SG2018/050229 on May 11, 2018, now Pat. No. 11,488,276.

(30) Foreign Application Priority Data

May 12, 2017 (WO) ................ PCT/SG2017/050252

(51) Int. Cl.
*G06Q 30/00* (2023.01)
*G06Q 10/02* (2012.01)
(Continued)

(52) U.S. Cl.
CPC ............. *G06Q 50/30* (2013.01); *G06Q 10/02* (2013.01); *G06Q 30/06* (2013.01); *G08G 1/202* (2013.01)

(58) Field of Classification Search
None
See application file for complete search history.

(56) References Cited

U.S. PATENT DOCUMENTS

| 9,165,319 B1 | 10/2015 | Henry |
| 2009/0248587 A1 | 10/2009 | Van Buskirk |
| (Continued) | | |

FOREIGN PATENT DOCUMENTS

| CN | 101216913 A | 7/2008 |
| CN | 104183118 A | 12/2014 |
| (Continued) | | |

OTHER PUBLICATIONS

International Search Report and Written Opinion of PCT/SG2017/050252, dated Aug. 22, 2017, 12 Pages.

(Continued)

*Primary Examiner* — Mila Airapetian
(74) *Attorney, Agent, or Firm* — Buckley, Maschoff & Talwalkar LLC

(57) ABSTRACT

A processor device has a CPU cooperating with an input device and an output device, under control of stored instructions, and is arranged to receive service requests at the input device, assign service requests received in successive time periods to respective batches of requests; access stored service provider data to identify available service providers from among a pool of service providers; after completing the assignment of service requests to a batch, perform a matching process to endeavour to match each service request of the batch of requests to a service provider; and for each service provider to whom a match is made, output a notification of the respective potential match from the output device.

20 Claims, 15 Drawing Sheets

(51) Int. Cl.
  *G06Q 30/06* (2023.01)
  *G06Q 50/30* (2012.01)
  *G08G 1/00* (2006.01)

(56) References Cited

U.S. PATENT DOCUMENTS

| | | | |
|---|---|---|---|
| 2013/0185359 A1* | 7/2013 | Liu | H04L 67/54 |
| | | | 709/204 |
| 2015/0161564 A1 | 6/2015 | Sweeney et al. | |
| 2015/0302342 A1 | 10/2015 | Yeh | |
| 2015/0339923 A1 | 11/2015 | Konig et al. | |
| 2016/0098650 A1 | 4/2016 | Rath et al. | |
| 2016/0110836 A1* | 4/2016 | Garg | G06Q 50/30 |
| | | | 705/13 |
| 2016/0138928 A1* | 5/2016 | Guo | G01C 21/3438 |
| | | | 701/537 |
| 2016/0292596 A1* | 10/2016 | Gaitan | G06Q 10/101 |
| 2016/0364678 A1* | 12/2016 | Cao | G06Q 10/083 |
| 2017/0011324 A1 | 1/2017 | Truong et al. | |
| 2017/0116696 A1 | 4/2017 | Moore | |
| 2018/0165731 A1* | 6/2018 | Gopalakrishnan | G06Q 50/30 |
| 2018/0315148 A1 | 11/2018 | Luo et al. | |

FOREIGN PATENT DOCUMENTS

| | | |
|---|---|---|
| CN | 104685533 | 6/2015 |
| JP | 2003-242217 | 8/2003 |
| JP | 2008-186380 | 8/2008 |
| JP | 2014-229222 | 12/2014 |
| KR | 2013-0002813 | 1/2013 |
| KR | 20160018886 A | 2/2016 |
| WO | WO-2011069170 A1 | 6/2011 |
| WO | WO-2015089207 A1 | 6/2015 |
| WO | WO-2018208232 A1 | 5/2018 |
| WO | WO-2018208226 A1 | 11/2018 |

OTHER PUBLICATIONS

International Search Report and Written Opinion of PCT/SG2018/050229, dated Sep. 3, 2018, 11 Pages.
International Preliminary Report on Patentability of PCT/SG2018/050229, dated Aug. 26, 2019, 6 Pages.
Alonso-Mora, On-demand high-capacity ride-sharing via dynamic trip-vehicle assignment, 2018, Proceedings of the National Academy of Sciences, vol. 114(3), pp. 462-467.
KR Office Action dated Feb. 8, 2021 for KR 10-2019-7036852, 15 pages.
Japanese Office Action for 2019-561312, dated Mar. 30, 2021.
Vietnamese Office Action for Application No. 2019-06335, dated Dec. 31, 2021 (4 pages).
Malaysian Office Action for Application No. PI2019006568, dated Jun. 29, 2021 (3 pages).
Korean Office Action for Application No. 2019-7036852, dated Aug. 20, 2021 (8 pages).
European Office Action for Application No. 18798755.7, dated Oct. 22, 2021 (12 pages).
Indian Office Action for Application No. 201917051065, dated Jun. 17, 2021 (7 pages).
Chinese Office Action for Application No. 201880036036.1, dated Oct. 13, 2022 (5 pages).

* cited by examiner

ALLOCATION OF DYNAMICALLY BATCHED SERVICE PROVIDERS AND SERVICE REQUESTERS

CROSS-REFERENCE TO RELATED APPLICATIONS

This application is Continuation of application Ser. No. 16/612,131, filed Nov. 8, 2019, which is a National Phase of International Application PCT/SG2018/050229, filed May 11, 2018, which designated the United States and that International Application was published under PCT Article 21(2) in English. This application also includes a claim of priority under 35 U.S.C. § 119(a) and § 365(b) to International Application PCT/SG2017/050252, filed May 12, 2017, the entirety of which is hereby incorporated by reference.

TECHNICAL FIELD

The present invention lies in the general fields of communication and data processing.

Embodiments relate generally to handling requests, and more specifically, to methods, systems, and devices for managing a plurality of transport-related service requests, including the dynamic matching of service requests to service providers.

BACKGROUND

Technological developments in computing technology and communications continue to empower providers to create and offer new and improved offerings for products and services.

Online services made available by such developments include, but are not limited to, information searching, purchasing, reserving, booking, adding-to-cart, leaving a deposit for, make partial payment, saving, and/or sharing of products and/or services. Today, users are increasingly able to more easily, efficiently, and effectively conduct online transactions for those products and/or services that have been traditionally conducted in other ways.

BRIEF SUMMARY

Despite recent advances in computing technology, including systems, devices, software, and communications, it is recognized in the present disclosure that difficulties or problems are oftentimes encountered when managing online interactions.

Present example embodiments relate generally to or comprise systems, subsystems, processors, devices, logic, and methods for addressing conventional problems, including those described above and in the present disclosure, and more specifically, example embodiments relate to systems, subsystems, processors, devices, logic, and methods of managing a plurality of transport-related service interactions.

There is disclosed a processor device for managing a plurality of transport-related service requests, the processor device having a CPU cooperating with an input device and an output device, under control of stored instructions, to: receive service requests at the input device, assign service requests received in successive time periods to respective batches of requests; access stored service provider data to identify available service providers from among a pool of service providers; after completing the assignment of service requests to a batch, perform a matching process to endeavour to match each service request of the batch of requests to a service provider; and for each service provider to whom a match is made, output a notification of the respective potential match.

There is also disclosed a method of managing a plurality of transport-related service requests, by means of a processor device having a CPU cooperating with an input device and an output device, under control of stored instructions, the method comprising receiving service requests at the input device, assign service requests received in successive time periods to respective batches of requests; access stored service provider data to identify available service providers from among a pool of service providers; after completing the assignment of requests to a batch, perform a matching process to endeavour to match each service request of the batch of requests with a service provider; and for each service provider for whom a match is made, output a notification of the respective potential match from the output device.

In an exemplary embodiment, a method for managing a plurality of transport-related service requests is described. The method may include establishing a first time period. The method may also include identifying one or more service requests received during the first time period. Each identified service request may include an origin location. The method may also include identifying one or more service providers from among a plurality of service providers. Each identified service provider may have a current service provider location and an availability status. Each identified service provider may have its availability status indicating that it is currently available to be matched with a service request. The method may also include establishing a service request geographical region and service provider geographical region. The method may also include selecting one or more candidate service requests from the plurality of identified service requests. Each candidate service request may have its origin location within the service request geographical region. The method may also include selecting one or more candidate service providers from the plurality of identified service providers. Each candidate service provider may have its current service provider location within the service provider geographical region. The method may also include performing a matching process to match one or more of the candidate service requests with one or more of the candidate service providers. The matching process may be based on at least a likelihood that a cancellation will occur.

In another exemplary embodiment, a method for managing a plurality of transport-related service requests is described. The method may include establishing a first time period. The method may also include identifying one or more service requests received during the first time period. Each identified service request may include an origin location. The method may also include identifying one or more service providers from among a plurality of service providers. Each identified service provider may have a current service provider location and an availability status.

Each identified service provider may have its availability status indicating that it is currently available to be matched with a service request. The method may also include establishing a service request geographical region and service provider geographical region. The method may also include selecting one or more candidate service requests from the plurality of identified service requests. Each candidate service request may have its origin location within the service request geographical region. The method may also include selecting one or more candidate service providers from the plurality of identified service providers. Each candidate service provider may have its current service provider location within the service provider geographical region. The method may also include dynamically adjusting the service request geographical region based on a quantity of the selected candidate service requests, a quantity of the selected candidate service providers, a distribution of the selected candidate service requests within the service request geographical region, and/or a distribution of the selected candidate service providers within the service provider geographical region. The method may also include, responsive to the dynamic adjustment of the service request geographical region, selecting one or more final service requests from at least the candidate service requests. Each final service request may have its origin location within the dynamically adjusted service request geographical region. The method may also include performing a matching process to match one or more of the final service requests with one or more of the candidate service providers.

In another exemplary embodiment, a method for managing a plurality of transport-related service requests is described. The method may include establishing a first time period. The method may also include identifying one or more service requests received during the first time period. Each identified service request may include an origin location. The method may also include identifying one or more service providers from among a plurality of service providers. Each identified service provider may have a current service provider location and an availability status.

Each identified service provider may have its availability status indicating that it is currently available to be matched with a service request. The method may also include establishing a service request geographical region and service provider geographical region. The method may also include selecting one or more candidate service requests from the plurality of identified service requests. Each candidate service request may have its origin location within the service request geographical region. The method may also include selecting one or more candidate service providers from the plurality of identified service providers. Each candidate service provider may have its current service provider location within the service provider geographical region. The method may also include dynamically adjusting the service provider geographical region based on a quantity of the selected candidate service requests, a quantity of the selected candidate service providers, a distribution of the selected candidate service requests within the service request geographical region, and/or a distribution of the selected candidate service providers within the service provider geographical region. The method may also include, responsive to the dynamic adjustment of the service provider geographical region, selecting one or more final service providers from at least the candidate service providers. Each final service provider may have its current service provider location within the dynamically adjusted service provider geographical region. The method may also include performing a matching process to match one or more of the candidate service requests with one or more of the final service providers.

In another exemplary embodiment, a method for managing a plurality of transport-related service requests is described. The method may include establishing a first time period. The method may also include identifying one or more service requests received during the first time period. Each identified service request may include an origin location. The method may also include identifying one or more service providers from among a plurality of service providers. Each identified service provider may have a current service provider location and an availability status.

Each identified service provider may have its availability status indicating that it is currently available to be matched with a service request. The method may also include establishing a service request geographical region and service provider geographical region. The method may also include selecting one or more candidate service requests from the plurality of identified service requests. Each candidate service request may have its origin location within the service request geographical region. The method may also include selecting one or more candidate service providers from the plurality of identified service providers. Each candidate service provider may have its current service provider location within the service provider geographical region. The method may also include dynamically adjusting the first time period based on a quantity of the selected candidate service requests relative to a threshold service request number and/or a quantity of the selected candidate service providers relative to a threshold service provider number. The method may also include, responsive to the dynamic adjustment of the first time period, selecting one or more final service requests from at least the candidate service requests. Each final service request may be a service request received during the dynamically adjusted first time period. The method may also include performing a matching process to match one or more of the final service requests with one or more of the candidate service providers.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements in the figures for convenience, it can be appreciated that each of the various example embodiments may be considered to be distinct variations.

Figure 1A:
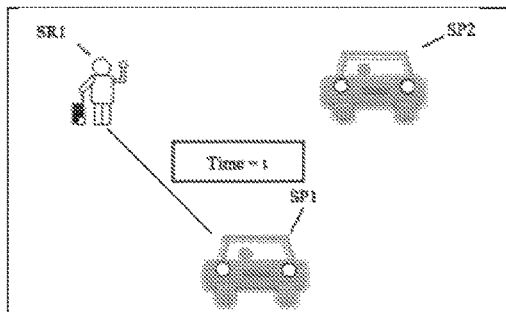
FIG. 1A is an illustration of an example situation of a service request instantaneously matched to a service provider.

Example embodiments will now be described with reference to the accompanying drawings, which form a part of the present disclosure and which illustrate example embodiments which may be practiced. As used in the present disclosure and the appended claims, the terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and the appended claims, the words "and/or" may refer to and encompass any and all possible combinations of one or more of the associated listed items.

DETAILED DESCRIPTION

Recent developments in computing technology continue to improve the ability for Service providers and users to interact online. Examples of service providers may include, but are not limited to, traditional and online merchants (e.g., retailers, department stores, e-commerce websites, etc.), providers of specialty products and/or services (e.g., transport-related services such as public transportation, private car hires, limousine services, shuttles, taxis, motorcycle taxis, ridesharing, delivery, etc.), intermediaries, resellers, brokers, those who provide platforms/services for comparative shopping and/or reviews, etc. (hereinafter a "service provider"). Technological solutions offered by such service providers continue to enable users to interact or transact, including purchase, reserve, book, add-to-cart, leave a deposit or partial payment, save, and/or share, such products and/or services with more ease, effectiveness, and/or efficiency.

As an example, technological advances have enabled transport-related services, such as public transportation (trains, buses, etc.), taxis (cars, vans, motorcycles, and other types of vehicles), private car hires, limousine services, shuttles, ride-sharing, delivery, etc., and other types of services, to be searched for, priced, compared, reserved, and/or booked (and/or cancelled) directly and with ease from a computing device (e.g., a desktop computer, laptop computer/ultrabook, mobile device, and/or wearable device) via a website or application (e.g., mobile application, widget, etc.).

Despite recent advances in such technologies, it is recognized in the present disclosure that difficulties or problems are oftentimes encountered when interacting online, and specifically, when managing a plurality of requests from users and matching such requests to service providers.

As an example, present approaches to managing transport-related requests (e.g., taxis or private car service, shuttle, ride share, delivery, etc.) from a plurality of users include, for each user, receiving a request, performing an immediate search for a suitable and available service provider (e.g., vehicle) nearest to the location of the user (or location provided by the user), and matching a found service provider to the user. While such an approach has generally been able to match requests to service providers, it is recognized in the present disclosure that problems, including inefficiencies and/or non-optimal matching are oftentimes encountered with such an approach. For example, while such approach provides for an immediate or quick matching of an available service provider to a request upon receiving the request, which may be optimal for that request (and/or service provider), it is recognized that such a match may not be an optimal (or the most optimal or one of the more optimal) match from one or more other standpoints (e.g., when considering one or more other requests, when considering one or more other service providers, when considering optimization on a larger geographical, time, and/or system level, etc.).

Figure 1B:
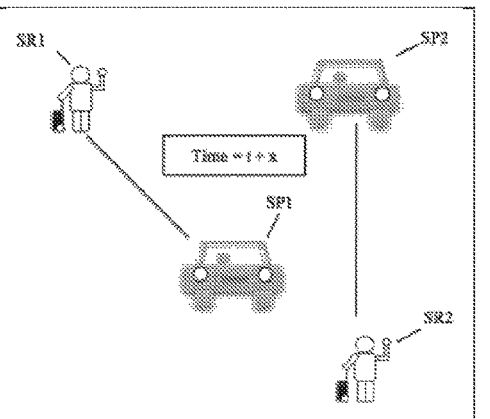
FIG. 1B is an illustration of another example situation of a service request instantaneously matched to a service provider.
Figure 1C:
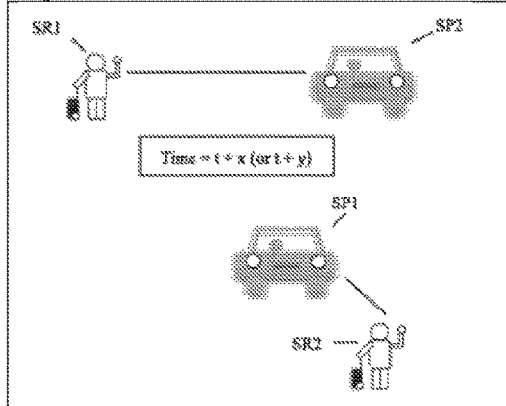
FIG. 1C is an illustration of an example situation of a service request matched to a service provider according to example embodiments.

As an illustrative example, although an immediate matching of a request to a nearest service provider at time t may be optimal from the standpoint of that request (e.g., shortest distance between the service provider and that particular request), it is recognized in the present disclosure that such immediate match at time t may not be an optimal match (e.g., when considering one or more other requests received shortly thereafter, such as at time (t+x). FIG. 1A illustrates an example situation of immediately matching a service request SR1 received at a time t to a nearest available service provider SP1 (where the line drawn between SR1 and SP1 depicts a matching, and where service provider SP1 is closer to service request SR1 than available service provider SP2), and FIG. 1B illustrates an example situation of immediately matching a subsequently received service SR2 received at a time (t+x) to a nearest available service provider SP2 (where the line drawn between SR2 and SP2 depicts a matching, and where service provider SP1 has already been matched to service request SR1). As can be seen in FIGS. 1A and 1B, while the matching between SR1 and SP1 may be optimal for that particular request at time t and the matching between SR2 and SP2 may be optimal for that particular request at time (t+x), FIG. 1C illustrates a more optimal matching implemented by an example embodiment, which receives a plurality of service requests during a period of time (e.g., t+x), identifies available service providers (and/or those service providers that will become available) during the period of time (e.g., t+x or t+y, where y is different from x), and performs a batch-based matching of such service requests and service providers. As illustrated in FIG. 1C, a more optimal matching may be achieved by matching SR1 to SP2 and matching SR2 to SP1, and such optimal matching may be collectively based on one or more criterion (as described in the present disclosure), such as distance, estimated time to travel to each request, traffic, etc.

Figure 1D:
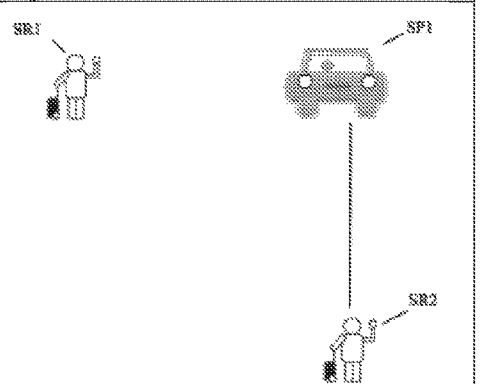
FIG. 1D is an illustration of another example situation of a service request instantaneously matched to a service provider.
Figure 1E:
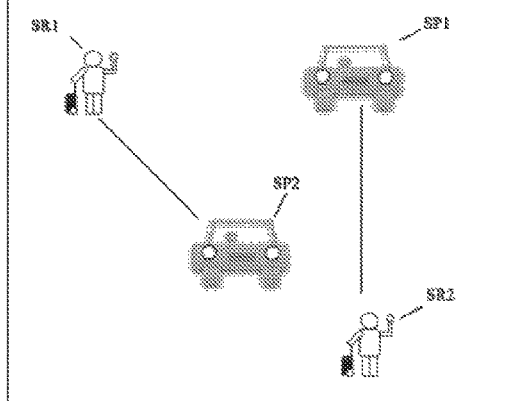
FIG. 1E is an illustration of another example situation of a service request instantaneously matched to a service provider.
Figure 1F:
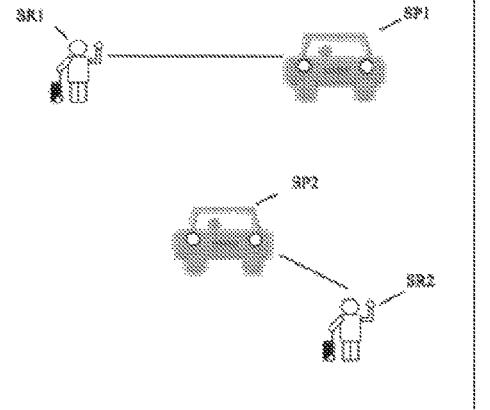
FIG. 1F is an illustration of an example situation of a service request matched to a service provider according to example embodiments.

As another illustrative example, although an immediate matching of a nearest request to a service provider at time t may be optimal from the standpoint of that request, it is recognized in the present disclosure that such immediate match at time t may not be an optimal match (e.g., when considering one or more other service providers that become available or will become available shortly thereafter, at time t+x. FIG. 1D illustrates an example situation of immediately matching a nearest service request SR2 to an available service provider SP1 at time t (where the line drawn between SR2 and SP1 depicts a matching, and where service request SR2 is closer to service provider SP1 than service request SR1), and FIG. 1E illustrates an example situation of immediately matching a subsequent service SR1 to a nearest available service provider SP2 that becomes available at time t+x (where the line drawn between SR1 and SP2 depicts a matching, and where service request SR2 has already been matched to service provider SP1). As can be seen in FIGS. 1D and 1E, while the matching between SR2 and SP1 may be optimal at time t and the matching between SR1 and SP2 may be optimal at time t+x, FIG. 1F illustrates a more optimal matching implemented by an example embodiment, which receives a plurality of service requests during a period of time (e.g., t+x), identifies available (or to become available) service providers during a period of time (e.g., t+x or t+y, where y is different from x), and performs a batch-based matching of such service requests and service providers. As illustrated in FIG. 1F, a more optimal matching may be achieved by matching SR1 to SP1 and matching SR2 to SP2.

Present example embodiments relate generally to and/or comprise systems, subsystems, processors, devices, logic, and methods for addressing conventional problems, including those described above and in the present disclosure, and more specifically, example embodiments relate to systems, subsystems, processors, devices, logic, and methods of interacting online, including managing of a plurality of product and/or service requests. Although example embodiments may be described in the present disclosure as pertaining to and/or for use with transport-related service requests, it is to be understood that example embodiments may also be applicable to and/or for use for other services, products, in other service industries other than transport-related industries, and in other environments, surroundings, situations, circumstances, and/or applications without departing from the teachings of the present disclosure. These example embodiments will now be described below with reference to the accompanying figures, which form a part of the present disclosure.

For the sake of completeness the term "user" refers to a person desirous of using a transport-related service, for example a rider or passenger. The term "service provider" refers to a person who provides such a service, for example a driver. Also the term "matched" means that a service provider is paired in theory with a user; the term "allocated" indicates that the service provider has accepted the job that was matched to him.

Figure 2:
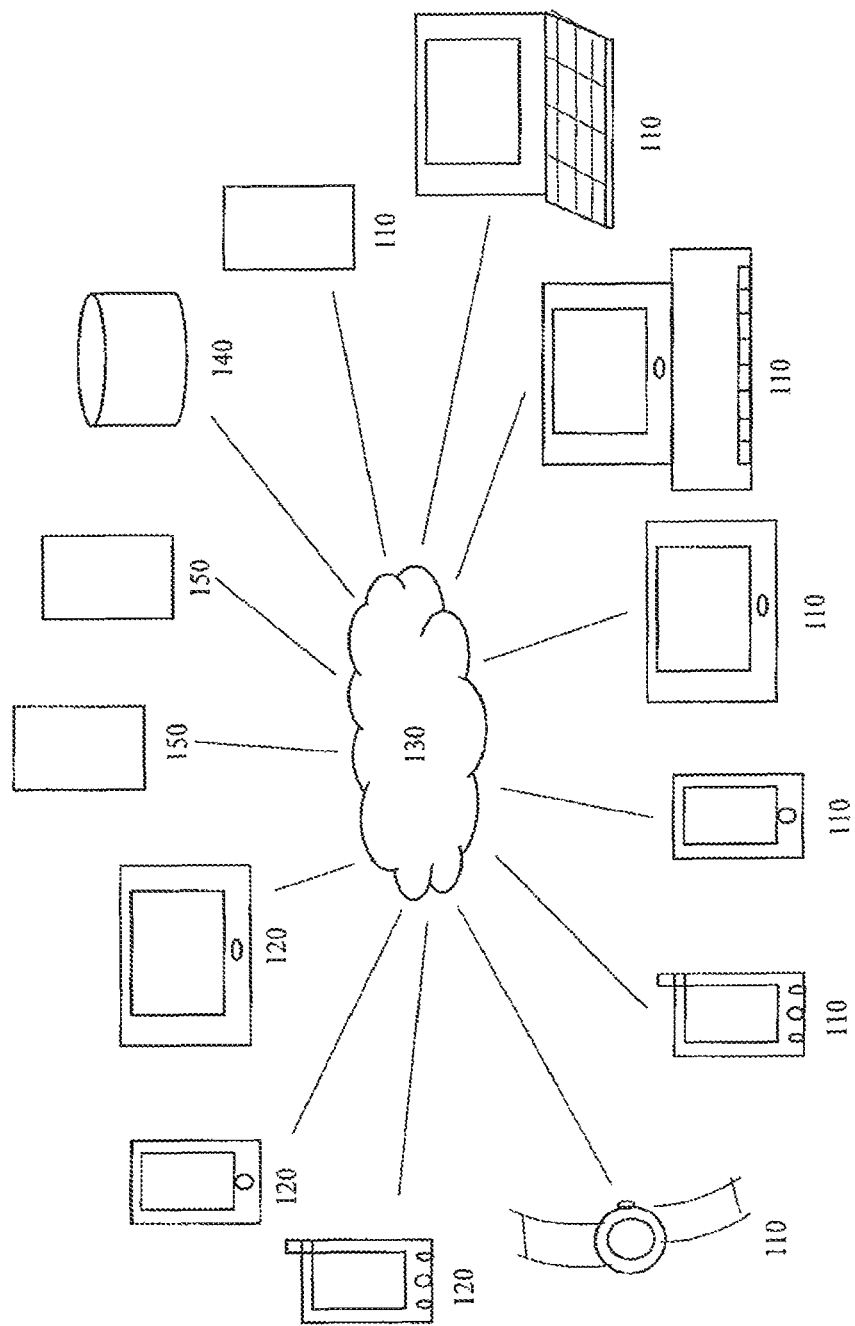
FIG. 2 is an illustration of an example embodiment of a system for managing service requests.

Referring to FIG. 2, a transport related management system includes plural user computing devices 110, and plural service provider computing devices 120. The user computing devices 110 in this embodiment run an app that enables a user to input a service request, with the relevant required information. The user computing devices 110 and service provider computing devices connect via a communications network 130 to a processor 150 and a database 140. For simplicity, the system of the described embodiment has one processor 150 and one database 140 but it will be understood by those skilled in the art that this is not restrictive. Embodiments having more than one processor and more than one database are envisaged.

Figure 8:
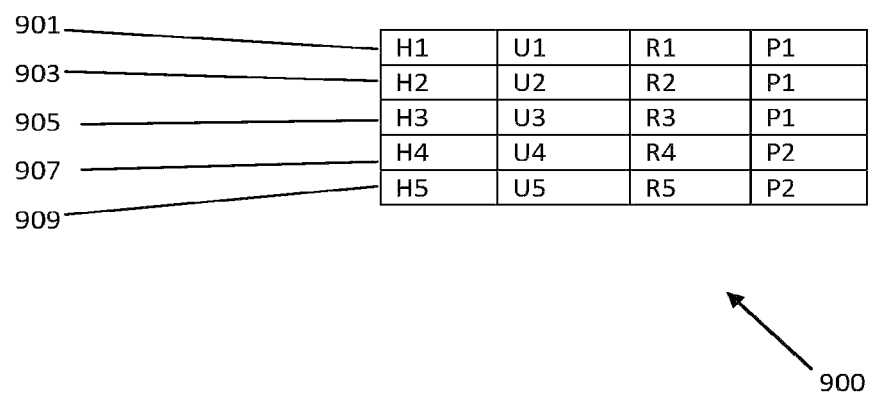
FIG. 8 shows highly schematic view of service request data in batches.

In use, users make service requests, e.g. for rides, by means of their user computing devices 110 configured to supply service request messages 51 to communications network 130 for processing. The service request messages 51 are encoded using a communications protocol. The service request messages have two types of data content: user level information content, indicative of the user, and user request level information, indicative of the request being made. Examples of service request messages as packets are shown in FIG. 8, for example request packet 901

User level information content includes at least some or more of user ID, Is it a new user? Is it a VIP user? User request level information content includes at least some or more of start location, destination, service type, time of pick up, fare, promotion, payment type, is it an advance booking?

Other deeper level information may be mined from data stored in the database if required—this could be inferred from previous behaviour and may include items such as "is it a promotion-driven user".

Service provider computing devices are configured in this embodiment to push service provider data 53 to the communications network 130 for processing. Service provider computing devices 120 provide service provider data which in the present embodiment comprises "ID of service provider", "current location", "availability status", "credit balance" (service providers need to have enough credit balance for being able to bid a booking).

Advanced levels of service provider information may be maintained in the database 140. This information includes data such as is it a gold service provider, acceptance rate, cancellation rate etc. Storing this centrally guards against possible falsification.

In other embodiments the service provider computing devices are interrogated using the communications network 130 by processor 150.

In the present embodiment service provider data is periodically pushed to processor 150. Once a user appears, the processor interrogates the available service provider computing devices.

Figure 9:
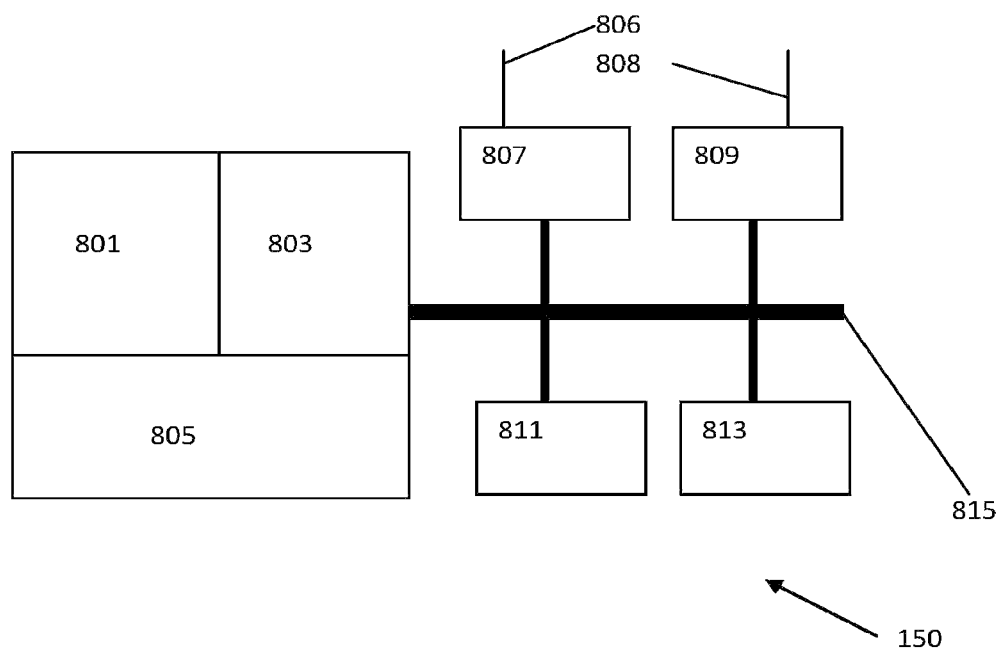
FIG. 9 shows a block schematic view of the physical integers of a processor.

Referring to FIG. 9, the physical layout of an exemplary processor 150 is shown in block schematic form. The processor 150 comprises an input device 807 and an output device 809, both being connected to a bus 815 leading to a CPU 801-5. The CPU consists of an arithmetic/logic unit 801, a register array 803 and a control device 807. The CPU is also connected by the bus 815 to memory, here consisting of volatile (i.e. read/write) memory 811 and non volatile (read only) memory 813.

The input device 807 has a connection 806 for receiving input data from external circuitry and the output device 809 has a connection for outputting data to external circuitry.

The CPU reads each instruction from the memory 811, 813 decodes it and executes it. It processes the data as required in the instructions. The processing is in the form of arithmetic and logical operations carried out by the ALU 801 under control of the control device 805. The data is retrieved from memory 811, 813 or taken from the input device 807 and the result of processing is stored in the memory 811,813 or delivered to the output device 809, all as per the instructions.

Returning to FIG. 2, data, including data from service request messages 51 and service provider data 53, is stored in real time in the database 140. The database 140 is configured to store information of users (such as demographic info, historical booking activity info etc) and service providers (such as demographic information, data related to bookings like pick up location, destination, fare, promotion etc and activity related to bookings, such as bid, ignore, cancel).

The database 140 provides access to the data at any time. It stores historical data of users and service providers and bookings. For example, regarding the history of cancellation, the database stores historical cancelled bookings data from both users and service providers, such as when the cancellation happened, what is the fare of the cancelled booking, what is the destination of the cancelled booking, what was the ETA (estimation time of arrival) of the cancelled booking etc.

In a simplified embodiment, data flows as follows: the user requests are buffered, then when a criterion is met (for instance reaching a set duration or number of requests), the multiple user requests are identified as a batch. Then a batch clearing request containing user request data, information on candidate service providers and additional historical features of both users and service providers (drivers) will be processed. Based on different prioritisation or de-prioritisation logic, the initial cost matrix that contains estimated driving distance or time will be modified to reflect multiple prioritisation/de-prioritisation logics. Based on the final cost matrix the allocation is optimised and user requests will be matched with candidate service providers. If there are enough service providers to serve all requests then all requests will be matched. If not, then the system recycles un-matched requests X times by sending the request in the succeeding batches. If the service provider who was matched in a pairing does not accept the request—i.e. ignores the request—the request is noted as unallocated and is recycled to a succeeding batch. After X times is reached if still unallocated a message is sent (e.g. "we couldn't find you a driver, please try again later") and the booking will be marked as unallocated in the database 140 and requester's (passenger's) app reverts to a booking screen.

Figure 7:
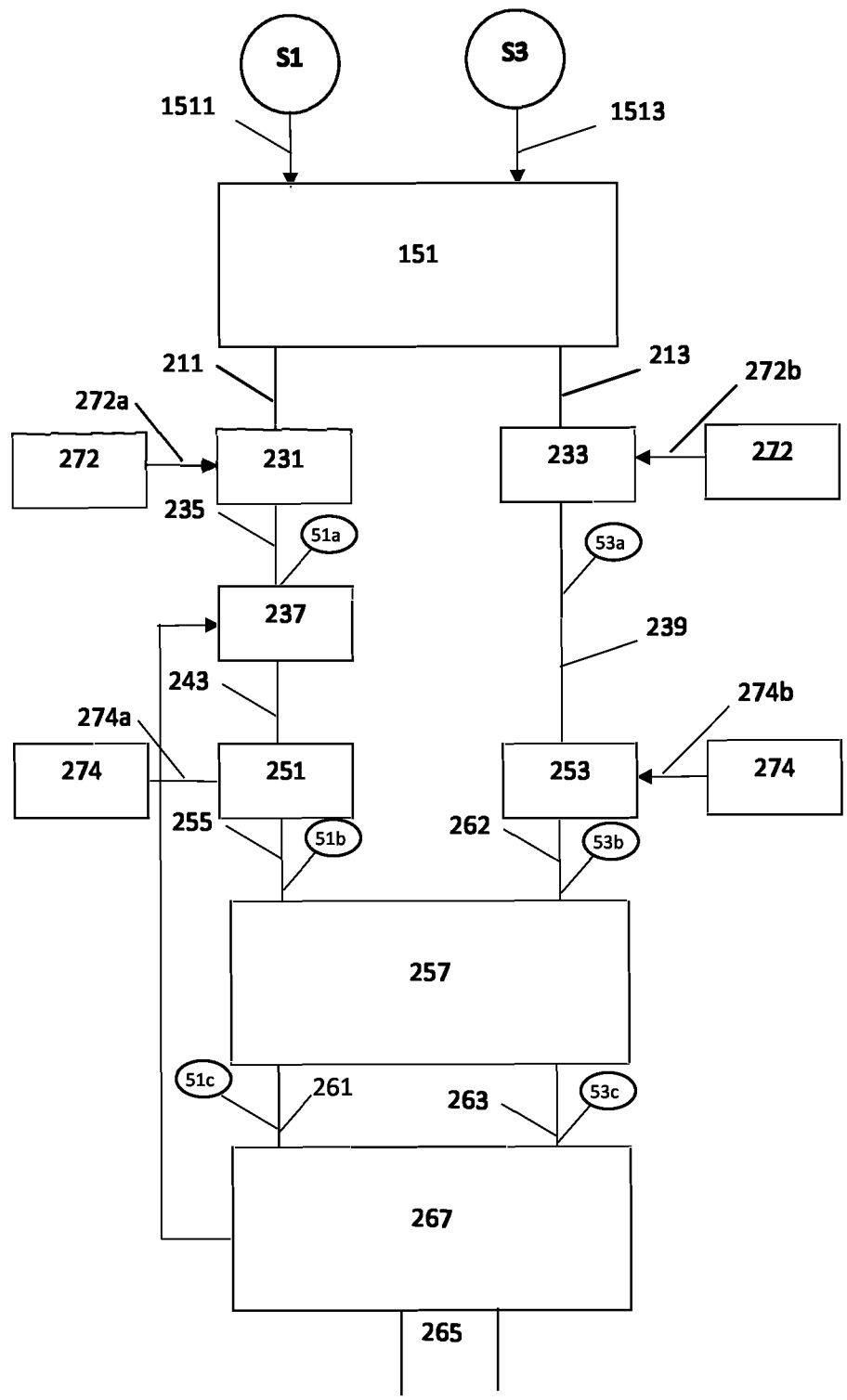
FIG. 7 shows a further example of a processor.

Referring to FIG. 7, in another simplified embodiment the processor 150 performs the function of a service aggregator 151 having one input 1511 configured to receive service request message data 51 from user computing devices 110 by means of which a user is making a user service request 51. A second input 1513 is configured to receive data 53 from service provider computing devices 120. The service aggregator 151 buffers incoming service request data 51.

The service aggregator 151 has a first output 211 providing an input to a user service identifier 231, and a second output 213 to a service provider identifier 233. The user service identifier 231 has a first output 235 to a buffer memory 237 which in turn has an output 243 forming an input to a user candidate selector 251. The service provider identifier 233 has an output 239 to a service provider candidate selector 253. The user candidate selector 251 has its output 255 forming a first input to a prioritizer 257, which has a first output 261 forming an input to a matching engine 267. The service provider candidate selector 253 has an output 262 to for a second input to the prioritizer 257 which has a second output 263 forming an input to matching engine 267. The matching engine has first outputs 265 for matching information, and also has a second output 269 feeding back to buffer memory 237.

This embodiment has a time interval selector 272 having a first output 272a forming an input to the user service identifier 231 and a second output 272b to the service provider identifier 233. A geographical area selector 274, has one output 274a forming an input to the user candidate selector 251 and a second output 274b forming an input to the service provider candidate selector 253.

In one embodiment each processor 150 covers a single overarching geographic region, and where more than one region is to be handled a corresponding number of processes is provided. In another embodiment, each processor covers more than one geographic region, for example sequentially.

In use, user service request messages 51 from users making service requests are input to the service aggregator 151 which gathers and classifies the individual messages.

In this embodiment, the service provider computing devices 110 push service provider data 53 to the processor 150, the service provider data comprising an identity of the service provider computing device 110, data indicative of the location of the service provider computing device, data indicative of the availability status of the service provider using the respective service provider computing device 120. Other parameters may also be included, for example service capability.

The contents of the user service request message 51 and the service provider data 53 are passed to the user service identifier 231 which is configured to identify first service request messages. The first service request messages are service request messages 51a that have been received by the service aggregator 151 in a first time interval set by the time interval selector output 272a.

The time interval selector 272 sets that first time interval to be long enough by comparison to the rate of service request receipt so that there will be a batch comprising plural service requests by the time the first time interval has ended. This is so that the later matching process can take into account the geographical or other relationship between all the members of the batch and the pool of available service providers so as to provide optimal matching across the whole of the batch, or at least more optimal than would occur if immediate matching were attempted. The batch of user requests is stored in the buffer memory 237, typically while an earlier batch is being matched. Once the current batch of user requests is assembled in buffer memory, the device starts to assemble a next batch.

Another reason for accumulating users into a batch is that it provides the opportunity for prioritisation between the members of the batch Delaying the start of matching until after a batch assembly is complete and then going on to assemble a next batch appears counter-intuitive because immediate matching seems at first sight to provide a quicker solution.

Referring to FIG. 8, a highly schematic drawing of batching requests 901-909 is shown. This figure shows logically grouping of service requests, for example in the database 140, representing two examples of batches. In this sketch, there are 5 user requests, each of which has a respective packet header H1-5, a respective user identity field U1-5, a respective field of request information R1-5. As noted above the request information includes information such as start location, destination etc. Each request also has a respective time field P1 or P2. As will be seen from FIG. 8, the topmost request 901, the second 903 and the third 905 have a time field of P1, indicating they were received in a first time period P1. The remaining requests 907,909 have a time field of P2, indicating they were received in a subsequent second time period. The first batch comprises requests 901,903,905. The second batch includes requests 907,909, and any subsequent requests received in the time period P2. Of course batches may have many more than 3 requests.

The service provider identifier 233 is configured, using the service provider data, to identify available service providers from among a pool of service providers. The term "available service providers" is defined as those having an availability status in the service provider data indicating that the service provider is currently available or is expected to be available shortly. "Shortly" means within a set period from the current time, the set period being a second time interval set at the time interval selector input 272b.

The buffer memory 237 is configured to hold at least a batch of user request data derived from the incoming request messages.

The output 243 of the user service identifier 153 thus comprises identified service request message data 51a representative of each of a batch of users who have made service requests in the first time interval. The output 239 of the service provider identifier 233 contains identified service provider data 53a representative of each of a pool of available service providers.

The first time period—the time for forming the batch of users—in some embodiments is fixed.

In other more preferred embodiments, the time is varied according to data traffic load. The variation may be preset to follow predicted data traffic, so for example, the time interval selector 272 via its output 272a could select a first time interval of 2 seconds during rush hours on a weekday, a first time interval of 3 seconds during other business hours on a weekday, and a first time interval of 5 seconds during the morning of each Sunday. In others the first time interval may respond directly to data traffic, so if the rate of service requests rises beyond a threshold, the time interval for creating the service request batch is shortened. And vice versa, if and when the number of service requests falls, for example at certain times of night. Similar measures may be taken if an increase, or decrease in service providers occurs. In some instances, the system itself responds additionally to the actual number of requests, so that if a set number of service requests is reached the batch is deemed full before the end of the first time interval and matching commences.

The identified service request message data 51a and identified service provider data 53a are passed to the candidate service request selector 251 which selects candidate service request data 51b . . . The identified service provider data 53a are passed to the candidate service provider selector 251 which selects candidate service provider data 53b. Candidate service request data 51b are those identified user service requests 51a having a location within a service request geographical region selected by the geographical region selector 274 via its first output 274a. The location is typically the location from which a ride is needed by a user. Candidate service provider data 53b are identified service provider data having a current or predicted location, within a service provider geographical region set by the service provider geographical region selector 274 via its second output 274b which region may or may not differ from the service request geographical region. In some embodiments the geographic region used in determining the candidate service providers is capable of being varied dynamically for example according to actual or predicted demand.

The candidate service request data 51b and candidate service provider data 53b move on to prioritizer 257.

This is configured to select high priority service requests 51c from among the candidate service request data 51b and to control, manage, and select high priority service providers 53c from the candidate service provider data 53b, for further processing by the matching engine 267. The selection from among the candidate service requests is based on one or more criteria, such as likelihood of cancellation, likelihood of fraud, or one or more other prioritization criterion. The selection from candidate service provider data 53b is based on one or more criterion, such as likelihood of cancellation, likelihood of fraud, or one or more other prioritization criterion.

The output of the prioritizer 257 comprises user service request data 51c and service provider data 53c in order of priority.

Compliance with the one or more criteria is determined at least in some instances by deriving information from the database 140, so that an individual users history can be checked with regard to historical behaviour—for example has this user a prior history of cancelling service requests? As can the history of a service provider whose data 53b shows him to be a candidate service provider for matching.

In an embodiment the prioritizer 257 includes a respective predictor for each of a number of criteria. These criteria in one embodiment are three in number and predict cancellation fraud and characteristics of service provider and user. Taking as an example the cancellation predictor this is configured to predict—for each requester-service provider pair—the likelihood that either party would cancel had they been matched. These predictions are based on data that are not only specific to the user or service provider, but also to the user-service provider pair (e.g. has this pair cancelled one another recently), the geographical region (e.g. average cancellation rate in this locality), time period (e.g. average cancellation rate in the last 5 minutes), request statistics (e.g. the estimated time of arrival and fare of the ride if the match were to be made) etc.

For historical data (e.g. historical cancel rates at a service provider/passenger/geography level), the processor 150 connects to the database 140 and accesses historical data from there. For more 'real-time' signals (e.g. fare, ETA were the match to be made) the processor either receives it directly from an app run by or on the service provider computing device 120, calculates it on the fly, or asks other services of a backend computer system to calculate it on the fly.

Thus, the predictor predicts candidate user-service provider pairs that are likely to be cancelled had they been matched So if there were M service providers and N requests being considered, predictions are first made for all M×N service provider-request pairs. At this point, no actual match has been made yet. Based partly on these predictions, the prioritizer 257 then decides which potential matches are high-priority, and then proceeds to match those high priority service requests in reality.

It is also possible to reduce the priority of pair of a service request and service provider if they have a high cancellation probability based upon prediction. Consider there is a service request, while there are 5 potential service providers nearby. Intuitively, it could be assumed useful to assign the request to the nearest service provider. However, based on upon the outcome of the cancellation predictor that even if the service request and the nearest service provider are matched, it may be predicted to be cancelled in 90% probability. Then it might not be a good idea to assign the request to the nearest service provider at the first place. Thus there is a need to de-prioritize the match of this pair before the match happens.

Turning to the fraud predictor, this looks at historical and other data to determine whether a participant in the system might be indulging in fraudulent activity, and amends the priority accordingly.

Finally the third predictor, based upon characteristics of user and service provider (service provider), operates to increase the priority or reduce the priority of candidate service requests based on one or more other criterion, such as those users of the service request having a new user status or special user status (e.g., VIP user, frequent user, loyal user). This data may be embedded into the app of the particular user running on their user computing device 110. For example, those candidate service requests that have a new user status may be increased in priority (i.e., placed as a higher priority to be matched pursuant to the specified time period). This predictor can also increase the priority or reduce the priority of candidate service providers based on factors, such as those service providers having a new service provider status or special service provider status (e.g., VIP service provider, loyal service provider, low activity status, etc). For example, the service provider predictor may increase the priority of one or more candidate service providers that have been determined to have a new service provider status or special service provider status. In such an example, those candidate service providers that have a new service provider status and/or special service provider status may be placed as a high priority to be matched.

Determination of status and the like usually means accessing the database 140, although some items of service provider status, for example, may be embedded into the service provider data After subjecting to the prioritizer, high priority service requests 51c and high priority service provider data 53c are passed to a matching engine 267. This processor 267 comprises matching logic by means of which matching is performed based on one or more criterion, such as distance, time, traffic conditions, road directions, construction areas, day of the year, day of the week, time of the day, holidays, historic statistics, or future predictions.

An aim of one embodiment is to match (and allocate) a service provider to each high priority user, and to match (and allocate) a user request to each high priority service provider. Although it would seem desirable to match high priority users and high priority providers together this is recognised as not necessarily a good strategy as they may be remote from each other.

In one embodiment the matching is based on a calculation, for some or all possible matches, of the total or an average distance travelled by the high priority service provider to reach a given location requested by the user making a user request, and the total or average time a user making a the high priority service request would wait for a high priority service provider. In such an example, the matching selected by the matching logic may be the matching that results in the lowest total or an average distance or the lowest total or average time to wait. As another example, the matching of each high priority service provider request to a high priority service provider may be based on a calculation, for some or all possible matches, of the total or average estimated it would take for the high priority service providers to reach the location indicated in the high priority service requests. In such an example, the matching selected by the matching logic may be the matching that results in the lowest total or a lowest average time.

In one embodiment the matching logic calculates an optimal allocation solution for the requests and vehicles in the batch received in the first time interval. The problem can be formulated as a mixed integer linear programming (MILP) model and can be solved by Kuhn-Munkres algorithm (or other open source and commercial LP solvers, such as CLP, SCIP, CPLEX and Gurobi etc.

If there are sufficient service providers (service providers) to meet the number of user requests then the processor may match all of the users with a service provider, ordered by the priority level assigned by the processor. If however there are too few service providers, then at the end of the matching process there will be one or more user requests 51d that remain unmatched. In that case in some embodiments these requests are fed back to the buffer memory 237 as part of a following batch of requests. This feeding back of each unmatched request is carried out for only a predetermined number of times so that unmatchable requests do not clog the system. The unmatched user requests 51d may include a data field indicative of the number of times the request has been unmatched so that the number of feedback attempts can be monitored, or other methods of monitoring will be clear to the skilled person. In the event that a match cannot be made within the predetermined number of attempts, a message is sent to the user's computing device 110.

The matching logic in some embodiments is programmed to take into account features such as distance, time, traffic conditions, road directions, construction areas, day of the year, day of the week, time of the day, holidays, historic statistics, or future predictions for these parameters.

The matching engine output is a matching pair of available service providers and service requests. Then the processor 150 at least substantially simultaneously sends a message to each of the service provider computer devices 120 of the service providers who have been matched. The message conveys detailed information of the respective matched service request, such as pick up location, destination, fare etc. It depends on the service provider whether to accept the booking or not. From user side, they will see a message, for example "please give driver some time to accept the booking" in their app screen.

The above embodiment envisages varying the time interval for which a batch of users is assembled. In some embodiments, the geographical region is varied dynamically according to load. For the partitioning task, current implementation pre-partitions a geographical region into disjoint contiguous areas based on historical request volume. The pre-partitioning is done recursively and represented by a tree. Each partition is represented by a node in the tree, and its sub-partitions are represented by the subtree rooted at that node. When the live request load for a particular partition node is high, the system deploys separate workers to service the load at each child node separately in parallel. The system will re-combine child partitions into their parent partition to clear batches together whenever the live request load becomes manageable.

This may be performed based upon the number of users or the number of service providers, or both. The size of the geographic regions and their location may be varied. For size, the geographical region may be reduced or extended.

The time interval selector 152 also defines a third time interval which is used by an overall housekeeping process to ensure that the processor 150 does not become overloaded. Assume that a device that processes the bookings and aggregates the bookings is able to meet 50 bookings spread over say 5 seconds. If the load of incoming requests reaches the 50 bookings in a very short period of time e.g. shorter than 1.2 seconds, the device might become overloaded. If the load grows in this way, in an embodiment, it triggers sharding logic. Sharding logic splits the booking load, for example the booking load of a particular vehicle type, between two or more devices, e.g. worker nodes, each in charge of bookings from certain geographic locations that have previously specified based on historical booking load to balance the load on the devices. The third time period (for example 30 minutes) is that period of time that after sharding has occurred before the system checks to see if the load has reduced and now can be handled again using only a single device, e.g. worker node or fewer devices than before.

Example Embodiments of a System for Managing Service Requests (e.g., System 100).

As an overview, an example embodiment of a system (e.g., system 100) for managing a plurality of service requests is illustrated in FIG. 2. The system 100 may include one or more processors (e.g., processor 150). As used in the present disclosure, when applicable, a reference to a processor may also refer to, apply to, and/or include a computing device, server, cloud-based computing, or the like, and/or functionality of a processor, computing device, server, cloud-based computing, or the like. The system 100 may also include one or more databases (e.g., database 140). The system 100 may also include one or more user computing devices (e.g., user computing device 110). The system 100 may also include one or more service provider computing devices (e.g., service provider computing device 120). The one or more processors 150, databases 140, user computing devices 110, and/or service provider computing devices 120 may be in communication with one another via one or more networks (e.g., network, 130), such as the Internet, World Wide Web, one or more private networks, or the like.

Example embodiments of the system (e.g., system 100) may include or not include one or more of the elements described above and in the present disclosure, may include additional elements, may include equivalent elements, may be formed and/or used in different sequences, actions, combinations, and/or configurations, and/or one or more of the elements (and/or elements of elements) may be combinable into a single element or divided into two or more elements. Communication using technologies other than the Internet are also contemplated in example embodiments without departing from the teachings of the present disclosure. These systems 100, and elements and functionality thereof will now be further explained with reference to the accompanying figures.

User Computing Device (e.g., User Computing Device 110).

As illustrated in at least FIG. 2, the system 100 may include one or more computing devices 110 for use by users (e.g., those who send service requests). User computing devices 110 may be any device, computing device, mobile computing device, processor, controller, or the like, configurable or configured to perform a processing of information, wired and/or wireless communications, and/or any of the other actions and/or processes described above and in the present disclosure. For example, the user computing device 110 may be configurable to perform wireless communications through 3G networks, 4G networks, 4G LTE networks, or the like, such as via a SIM card installed in the user computing device 110, or the like. In addition to or in replacement, the user computing device 110 may be configurable to perform wireless communications via WLANs, such as Wi-Fi networks and Li-Fi networks, and/or via other forms, such as Bluetooth, NFC, and other forms of wireless signals. One or more of the aforementioned communications may be between example embodiments of the user computing device 110, one or more processors 150, one or more service provider computing devices 120, one or more databases 140, and/or one or more networks 130. The user computing device 110 may be configured (e.g., via a mobile application installed on the user computing device) to communicate, wirelessly or via wires, with the processor 150 and such communications may include sending service requests, viewing available service providers and fees, etc.

In an example embodiment, the user computing device 110 described herein may be directed to and/or include mobile computing devices, smart phones, mobile phones, PDAs phablets, tablets, portable computers, laptops, notebooks, ultrabooks, readers, electrical devices, media players, specialized devices (e.g., a dedicated or specialized device to communicate with and/or operate in the system 100, or parts thereof), a plurality of computing devices interacting together in part or in whole, and other specialized computing devices and industry-specific computing devices. The user computing device 110 may also be directed to and/or include wearable computing devices, including watches (such as the Apple Watch), glasses, etc. The user computing device 110 may also be directed to and/or include a virtual machine, computer, node, instance, host, or machine in a networked computing environment. Such networked environment, and/or cloud, may be a collection of machines connected by communication channels that facilitate communications between machines and allow for machines to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

Service Provider Computing Device (e.g., Service Provider Computing Device 120).

As illustrated in at least FIG. 2, the system 100 may include one or more computing devices 120 for use by service providers (i.e., those who provide services requested by users and/or user computing devices). Service provider computing devices 120 may be any device, computing device, mobile computing device, processor, controller, or the like, configurable or configured to perform a processing of information, wired and/or wireless communications, and/or any of the other actions and/or processes described above and in the present disclosure. For example, the service provider computing device 120 may be configurable to perform wireless communications through 3G networks, 4G networks, 4G LTE networks, or the like, such as via a SIM card installed in the service provider computing device 120, or the like. In addition to or in replacement, the service provider computing device 120 may be configurable to perform wireless communications via WLANs, such as Wi-Fi networks and Li-Fi networks, and/or via other forms, such as Bluetooth, NFC, and other forms of wireless signals. One or more of the aforementioned communications may be between example embodiments of the service provider computing device 120, one or more processors 150, one or more user computing devices 110, one or more databases 140, and/or one or more networks 130. The service provider computing device 120 may be configured (e.g., via a mobile application installed on the service provider computing device) to communicate, wirelessly or via wires, with the processor 150 and such communications may include receiving service requests that need to be serviced, receiving a match to a service request, accepting to service a service request, etc.

In an example embodiment, the service provider computing device 120 described herein may be directed to and/or include mobile computing devices, smart phones, mobile phones, PDAs phablets, tablets, portable computers, laptops, notebooks, ultrabooks, readers, electrical devices, media players, specialized devices (e.g., a dedicated or specialized device to communicate with and/or operate in the system 100, or parts thereof), a plurality of computing devices interacting together in part or in whole, and other specialized computing devices and industry-specific computing devices. The service provider computing device 120 described herein may also be directed to and/or include wearable computing devices, including watches (such as the Apple Watch), glasses, etc. The service provider computing device 120 may also be directed to and/or include a virtual machine, computer, node, instance, host, or machine in a networked computing environment. Such networked environment, and/or cloud, may be a collection of machines connected by communication channels that facilitate communications between machines and allow for machines to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. It is to be understood in the present disclosure that the service provider computing device 120 and the user computing device 110 may be any computing device operable to perform information processing and wireless communications, and the service provider computing device 120 and the user computing device 110 may be a similar or the same type of computing device.

Processor (e.g., Processor 150).

Figure 3A:
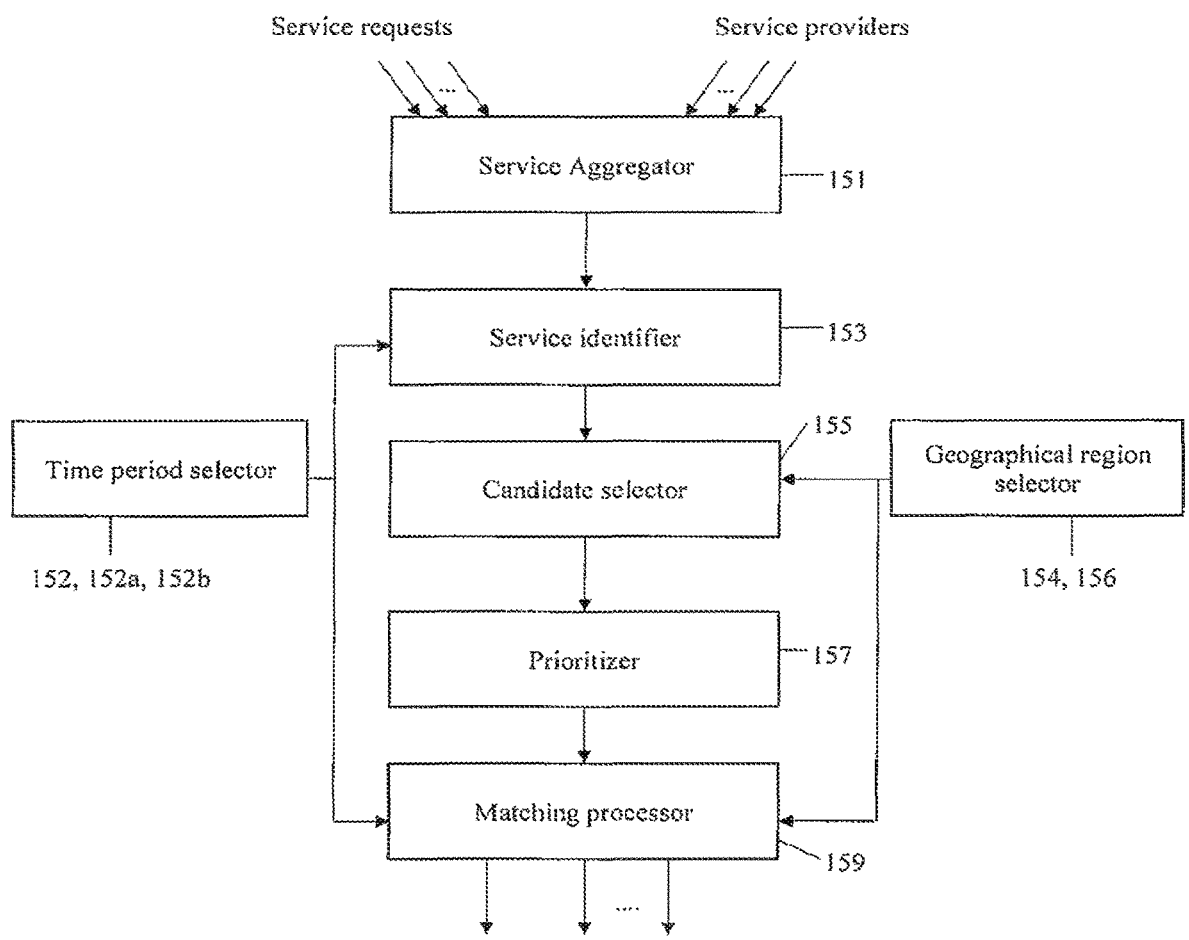
FIG. 3A is an illustration of an example embodiment of a processor and/or elements thereof and/or functionality thereof for managing service requests.

As illustrated in at least FIG. 2 and FIG. 3A, the system 100 may include one or more processors (e.g., processor 150). An example embodiment of the processor 150 may include one or more service aggregators (e.g., service aggregator 151), one or more service identifiers (e.g., service identifier 153), one or more candidate selectors (e.g., candidate selector 155), one or more prioritizers (e.g., prioritizer 157), and/or one or more matching processors (e.g., matching processor 159). The processor 150 may also be configurable or configured to perform one or more operations, functions, and/or processes of the service aggregator 151, the service identifier 153, the candidate selector 155, the prioritizer 157, and/or the matching processor 159.

Figure 3B:
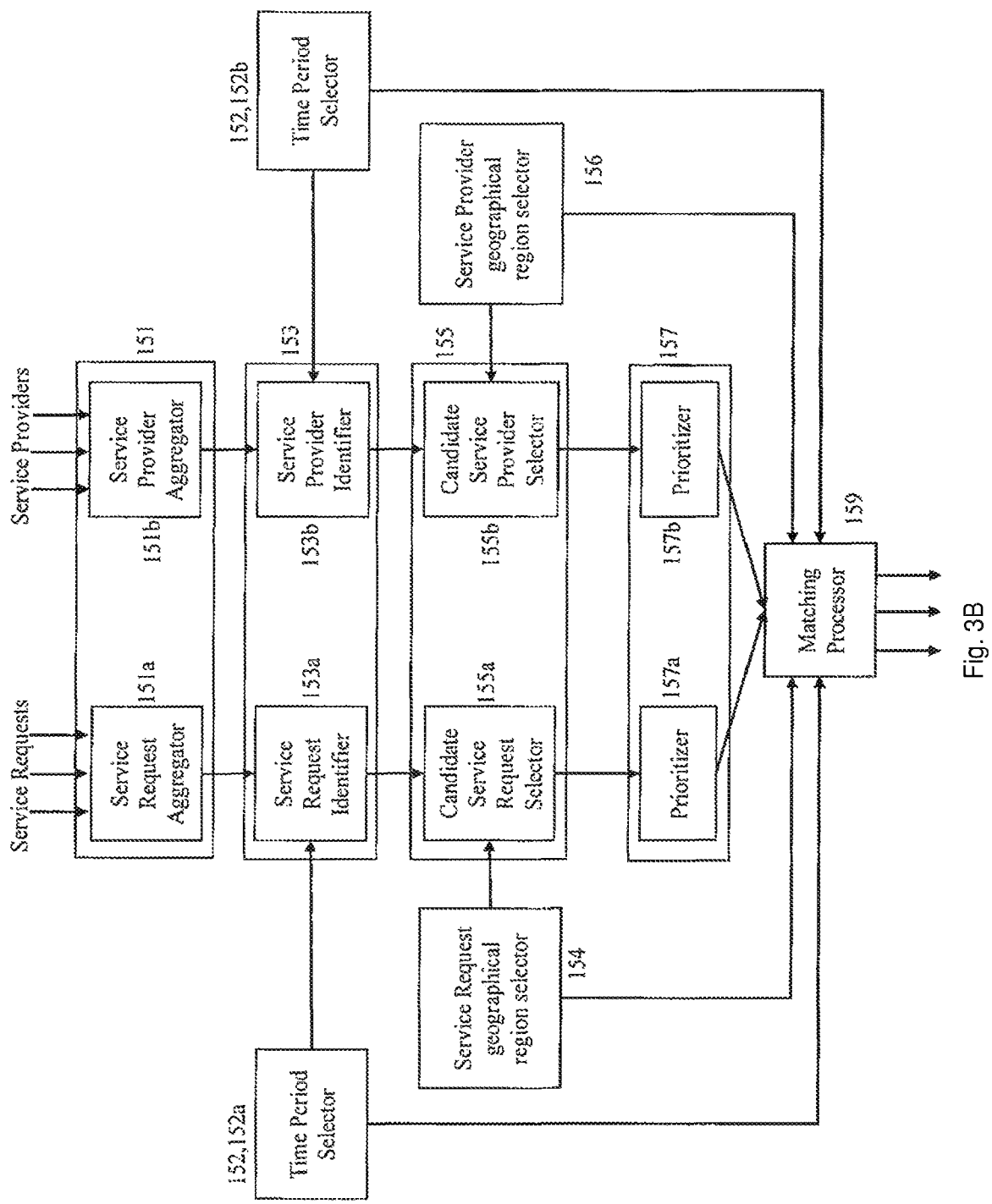
FIG. 3B is an illustration of another example embodiment of a processor and/or elements thereof and/or functionality thereof for managing service requests.

As illustrated in at least FIG. 3A and FIG. 3B, an example embodiment of the service aggregator 151 may include a service request aggregator (e.g., service request aggregator 151, 151*a*) and/or service provider aggregator (e.g., service provider aggregator 151, 151*b*). The service identifier 153 may include a service request identifier (e.g., service request identifier 153, 153*a*) and/or a service provider identifier (e.g., service provider identifier 153, 153*b*). The time period selector 152 may include a service request time period selector (e.g., time period selector 152, 152*a*) and/or service provider time period selector (e.g., time period selector 152, 152*b*)). The candidate selector 155 may include a candidate service request selector (e.g., candidate service request selector 155, 155*a*) and/or candidate service provider selector (e.g., candidate service provider selector 155, 155*b*). The geographical region selector 154, 156 may include a service request geographical region selector (e.g., service request geographical region selector 154) and/or service provider geographical region selector (e.g., service provider geographical region selector 156). The prioritizer 157 may include a service request prioritizer (e.g., prioritizer 157, 157*a*) and/or service provider prioritizer (e.g., prioritizer 157, 157*b*).

The processor 150 (and/or its elements, as described in the present disclosure) may be any processor, server, device, computing device, server, controller, microprocessor, microcontroller, microchip, semiconductor device, or the like, configurable or configured to perform, among other things, a processing of information, voice and/or data communications, and/or other actions described above and in the present disclosure. Alternatively or in addition, the processor 150 (and/or its elements, as described in the present disclosure) may include and/or be a part of a virtual machine, processor, computer, node, instance, host, or machine, including those in a networked computing environment. As used in the present disclosure, such a network and/or cloud may be a collection of devices connected by communication channels that facilitate communications between devices and allow for devices to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. A network or cloud may include, but is not limited to, computing grid systems, peer to peer systems, mesh-type systems, distributed computing environments, cloud computing environment, etc. Such network or cloud may include hardware and software infrastructures configured to form a virtual organization comprised of multiple resources which may be in geographically disperse locations. Network may also refer to a communication medium between processes on the same device. Also as referred to herein, a network element, node, or server may be a device deployed to execute a program operating as a socket listener and may include software instances.

Example embodiments of the processor 150 may include or not include one or more of the elements and/or functionality described above and in the present disclosure, may include additional elements and/or functionality, may be formed and/or used in different sequences, actions, combinations, and/or configurations, and/or one or more of the elements and/or functionality (and/or elements of elements and/or functionality of elements) may be combinable into a single element, single functionality, divided into two or more elements, and/or divided into two or more functionalities. The processor 150, and elements and functionality thereof, will now be further explained with reference to the accompanying figures.

Service Request Aggregator (e.g., Service Request Aggregator 151, 151*a*).

The processor 150 may include and/or perform one or more functionalities of one or more service request aggregators (e.g., service request aggregator 151, 151*a*). The service request aggregator 151, 151*a* may be configurable or configured to aggregate one or more service requests received (and/or requested), directly or indirectly, from one or more user computing devices 120. In an example embodiment, the service request aggregator 151, 151*a* may be configurable or configured to receive (and/or request) and aggregate service requests based on one or more criterion, such as by geographical region, time or period of time (e.g., years, months, weeks, days, hours, minutes, seconds, etc.), type of service requested (e.g., taxi, private car, public transportation, shuttle, limousine, ride share, delivery, etc.), location (e.g., current location, initial location, origin location, starting location, desired destination, etc.), user-specific criterion (e.g., new user, existing user, VIP user, frequent user, etc.), preferences of service provider (e.g., new service provider, experienced service provider, high rating service provider, user profile, etc.), etc. In respect to geographical region, the service request aggregator 151, 151*a* may be configurable to aggregate service requests received based on country, region, province, state, city, county, district, specific area (e.g., within certain city blocks, on certain roads, within a geometric shape drawn on a map, etc.), etc. In respect to time periods, the service request aggregator 151, 151*a* may be configurable to aggregate service requests received based on year, month, week, day, specific hour(s) and/or minutes (e.g., for each hour or each running hour), etc. As an example, the service request aggregator 151, 151*a* may be configurable to aggregate taxi requests received in one predetermined or dynamically generated area of the central business district (CBD) of a city for each 15 minute period. In such an example, the service request aggregator 151, 151*a* may also be configurable to aggregate taxi requests received in other (e.g., adjacent) predetermined or dynamically generated areas of the CBD of that city for the same or different 15 minute period. Similarly, the service request aggregator 151, 151*a* may also be configurable to aggregate such service requests received in other areas of that city (and for other cities) for other types of services (e.g., private car, ride share, delivery, etc.) and/or other criterion for the same or different time periods. It is recognized in the present disclosure that the one or more criterion and/or parameters, including geographical region, period of time, type of service requested, etc., used by the service request aggregator 151, 151*a* may be any criterion and/or parameter thereof (e.g., any amount, duration, type, etc.) without departing from the teachings of the present disclosure.

Service Provider Aggregator (e.g., Service Provider Aggregator 151, 151*b*).

The processor 150 may include and/or perform one or more functionalities of one or more service provider aggregators (e.g., service provider aggregator 151, 151*b*). The service provider aggregator 151, 151*b* may be configurable or configured to aggregate, directly or indirectly, one or more service providers based on one or more criterion, such as by geographical region, period of time (e.g., years, months, weeks, days, hours, minutes, seconds, etc.), type of services available (e.g., taxi, private car, public transportation, shuttle, limousine, ride share, delivery, etc.), location (e.g., current location, initial location, origin location, starting location, projected/estimated/predicted/expected location, etc.), availability status (e.g., available or not available to provide services, will be available or will not be available to provide services, predicted or expected availability or unavailability to provide services, etc.), service provider-specific criterion (e.g., new service provider, existing service provider, low activity service provider, etc.), preferences of user and/or service request (e.g., new users, loyal users, frequent users, VIP users, high rating users, etc.), etc. In respect to geographical region, the service provider aggregator 151, 151*b* may be configurable to aggregate service providers based on country, region, province, state, city, county, district, specific area (e.g., within certain city blocks, on certain roads, within a geometric shape drawn on a map, etc.), etc. In respect to time periods, the service provider aggregator 151, 151*b* may be configurable to aggregate service providers based on year, month, week, day, specific hour(s) and/or minutes (e.g., for each hour or each running hour), etc. As an example, the service provider aggregator 151, 151*b* may be configurable to aggregate some or all taxi service providers currently located (or projected, predicted, estimated, or expected to be located) in one predetermined or dynamically generated area of the central business district (CBD) of a city for each 15 minute period. In such an example, the service provider aggregator 151, 151*b* may also be configurable to aggregate taxi service providers in other (e.g., adjacent) predetermined or dynamically generated areas of that city (and other cities) for the same or different time period. It is recognized in the present disclosure that the one or more criterion and/or parameters thereof, including geographical region, period of time, etc., used by the service provider aggregator 151, 151*b* may be any criterion and/or parameter thereof (e.g., any amount, duration, and/or type) without departing from the teachings of the present disclosure.

In an example embodiment, a single aggregator 151 may be configurable to perform the functions and operations of the service request aggregator 151, 151*a* and service provider aggregator 151, 151*b*. Alternatively or in addition, a plurality of aggregators 151 may be configurable to perform the functions and operations of the service request aggregator 151, 151*a* and/or service provider aggregator 151, 151*b*.

Service Request Identifier (e.g., Service Request Identifier 153, 153*a*).

The processor 150 may include and/or perform one or more functionalities of one or more service request identifiers (e.g., service request identifier 153, 153*a*). The service request identifier 153, 153*a* may be configurable or configured to identify one or more service requests received in a specified time period, and such service requests received may be those aggregated by the service request aggregator 151, 151*a*. The specified time period may be a fixed time period and/or a dynamically determined time period, and such time period may be determined by the time period selector 152, 152*a*. In an example embodiment, each identified service request received during the specified time period may include a location (e.g., current location, initial location, origin location, starting location, desired destination, etc.).

Service Provider Identifier (e.g., Service Provider Identifier 153, 153*b*).

The processor 150 may include and/or perform one or more functionalities of one or more service provider identifiers (e.g., service provider identifier 153, 153*b*). The service provider identifier 153, 153*b* may be configurable or configured to identify one or more service providers from among a plurality of service providers (e.g., from among service providers aggregated by the service provider aggregator 151, 151*b*). Such identified service providers may be those having an availability status indicating that it is currently available (and/or will be available or predicted/projected/estimated/expected to be available) during a specified time period to be matched with a service request. The specified time period may be a fixed time period and/or dynamically determined time period, and such time period may be determined by the time period selector 152, 152*a*. The specified time period may be the same as or different from the specified time period used by the service request identifier 153, 153*a* to identify the one or more service requests (as described above and in the present disclosure). In an example embodiment, each identified service provider may include a location (e.g., the location of the service provider at the current time or predicted/projected/estimated/expected location of the service provider at a future time, such as during or after the specified time period).

In an example embodiment, a single identifier 153 may be configurable to perform the operations of the service request identifier 153, 153*a* and service provider identifier 153, 153*b*. Alternatively or in addition, a plurality of identifiers 153 may be configurable to perform the operations of the service request identifier 153, 153*a* and/or service provider identifier 153, 153*b*

Time Period Selector (e.g., Time Period Selector 152, 152*a*, 152*b*).

The processor 150 may include and/or perform one or more functionalities of one or more time period selectors (e.g., time period selector 152, 152*a* for service request processing and time period selector 152, 152*b* for service provider processing). The time period selector 152, 152*a* may be configurable or configured to control, manage, select, and/or dynamically generate a specified time period (e.g., select statically from a predetermined one or more options and/or dynamically generated based on one or more considerations, as described in the present disclosure) for use by one or more elements of the processor 150 (e.g., service request identifier 153, 153*a* and/or matching processor 159). Similarly, the time period selector 152, 152*b* may be configurable or configured to control, manage, select, and/or dynamically generate a specified time period (e.g., select statically from a predetermined one or more options and/or dynamically generated based on one or more considerations, as described in the present disclosure) for use by one or more elements of the processor 150 (e.g., service provider identifier 153, 153*b* and/or matching processor 159). In an example embodiment, the time period selectors 152, 152*a* and 152, 152*b* may select and/or dynamically generate the same or different specified time periods, and such time periods may be based on one or more criterion, such as date, day of the week, time of the day, holiday or special day, historic considerations, etc. For example, the time period selector 152, 152*a* may select a specified time period of 5 seconds during rush hours on a weekday, a specified time period of 8 seconds during other business hours on a weekday, and a specified time period of 10 seconds during the morning of each Sunday.

In an example embodiment, a single time period selector 152 may be configurable to perform the functions and operations of the time period selectors 152, 152*a* and 152, 152*b*. Alternatively or in addition, a plurality of time period selectors 152 may be configurable to perform the functions and operations of the time period selectors 152, 152*a* and/or 152, 152*b*.

Service Request Geographical Region Selector (e.g., Service Request Geographical Region Selector 154).

The processor 150 may include and/or perform one or more functionalities of one or more service request geographical region selectors (e.g., service request geographical region selector 154). The service request geographical region selector 154 may be configurable or configured to identify and/or establish a service request geographical region. The service request geographical region may be any area or region. For example, the service request geographical region may be any area, region, portion, subset, and/or division of the geographical region used by the service request aggregator 151, 151*a*. The service request geographical region may be for use in setting a geographical area in respect of which service requests can be identified and further selected for matching with identified and selected service providers (which will similarly be within a geographical area referred to as a service provider geographical region, as described in the present disclosure). In an example embodiment, the service request geographical region selector 154 may be configurable to control, manage, select, and/or dynamically generate a service request geographical region (e.g., select statically from a predetermined one or more options and/or dynamically generated based on one or more considerations, as described in the present disclosure) for use by one or more elements of the processor 150 (e.g., candidate service request selector 155*a*, prioritizer 157*a*, and/or matching processor 159).

Service Provider Geographical Region Selector (e.g., Service Provider Geographical Region Selector 156).

The processor 150 may include and/or perform one or more functionalities of one or more service provider geographical region selectors (e.g., service provider geographical region selector 156). The service provider geographical region selector 156 may be configurable or configured to identify and/or establish a service provider geographical region. The service provider geographical region may be any area or region. For example, the service provider geographical region may be any area, portion, subset, and/or division of the geographical region used by the service provider aggregator 151, 151*b*. The service provider geographical region may be for use in setting a geographical area in respect of which service providers can be identified and further selected for matching with identified and selected service requests (which will similarly be within the service request geographical region, as described in the present disclosure). In an example embodiment, the service provider geographical region selector 156 may be configurable to control, manage, select, and/or dynamically generate a service provider geographical region (e.g., select statically from a predetermined one or more options and/or dynamically generated based on one or more considerations, as described in the present disclosure) for use by one or more elements of the processor 150 (e.g., candidate service provider selector 155*b*, prioritizer 157*b*, and/or matching processor 159).

In an example embodiment, the service request geographical region selector 154 and service provider geographical region selector 156 may select and/or generate the same or different geographical regions, and such geographical regions may be based on one or more criterion, such as date, day of the week, time of the day, holiday or special day, historic considerations, road conditions, traffic conditions, direction of traffic, etc. For example, the service request geographical region may be a portion of the CBD of a city and the service provider geographical region may be the same portion (or a different portion) of the CBD of the city.

In an example embodiment, a single geographical region selector 154, 156 may be configurable to perform the functions and operations of the service request geographical region selector 154 and service provider geographical region selector 156. Alternatively or in addition, a plurality of geographical region selectors 154, 156 may be configurable to perform the functions and operations of the service request geographical region selector 154 and service provider geographical region selector 156.

Candidate Service Request Selector (e.g., Candidate Service Request Selector 155, 155a).

The processor 150 may include and/or perform one or more functionalities of one or more candidate service request selectors (e.g., candidate service request selector 155, 155a). The candidate service request selector 155, 155a may be configurable or configured to select one or more candidate service requests from among the plurality of service requests identified by the service request identifier 153, 153a. Each candidate service request selected by the candidate service request selector 155, 155a may be an identified service request having its location (e.g., current location, initial location, origin location, starting location, etc.) within the service request geographical region selected and/or generated by the service request geographical region selector 154.

Candidate Service Provider Selector (e.g., Candidate Service Provider Selector 155, 155b).

The processor 150 may include and/or perform one or more functionalities of one or more candidate service provider selectors (e.g., candidate service provider selector 155, 155b). The candidate service provider selector 155, 155b may be configurable or configured to select one or more candidate service providers from among the plurality of service providers identified by the service provider identifier 153, 153b. Each candidate service provider selected by the candidate service provider selector 155, 155b may be an identified service provider having its location (e.g., current location, initial location, origin location, starting location, projected/estimated/predicted/expected location, etc.) within the service provider geographical region selected and/or generated by the service provider geographical region selector 156.

In an example embodiment, a single candidate selector 155 may be configurable to perform the functions and operations of the candidate service request selector 155, 155a and candidate service provider selector 155, 155b. Alternatively or in addition, a plurality of candidate selectors 155 may be configurable to perform the functions and operations of the candidate service request selector 155, 155a and candidate service provider selector 155, 155b.

Service Request Prioritizer (e.g., Service Request Prioritizer 157, 157a).

Figure 4:
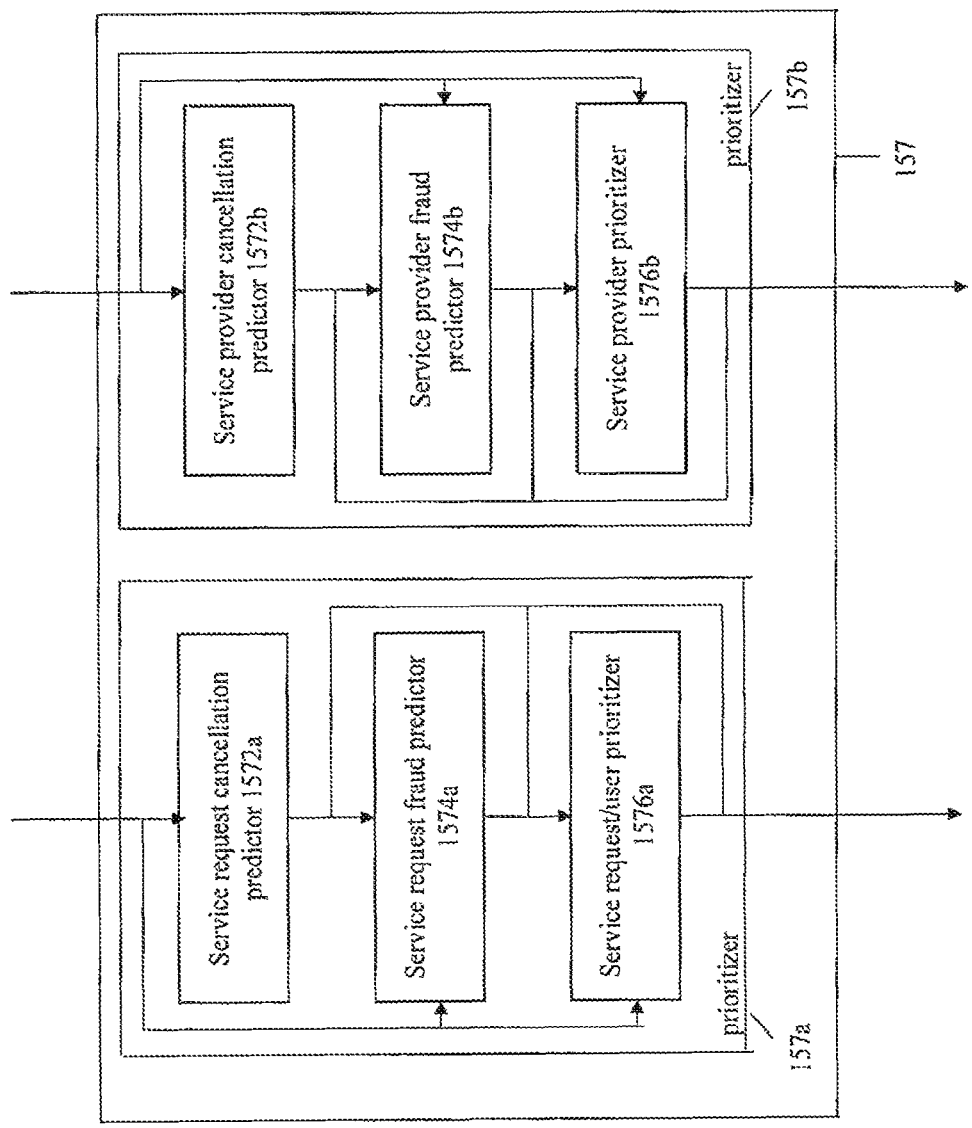
FIG. 4 is an illustration of an example embodiment of a prioritizer.

The processor 150 may include and/or perform one or more functionalities of one or more service request prioritizers (e.g., service request prioritizer 157, 157a). The service request prioritizer 157, 157a may be configurable or configured to control, manage, and/or select service requests (e.g., for further processing by the matching processor 159) from among the candidate service requests selected by the candidate service request selector 155, 155a. The service request prioritizer 157, 157a may select such candidate service requests based on one or more criterion, such as likelihood of cancellation, likelihood of fraud, one or more other prioritization criterion, etc. As illustrated in FIG. 4, an example embodiment of the service request prioritizer 157, 157a may include one or more service request cancellation predictors (e.g., service request cancellation predictor 1572a), one or more service request fraud predictors (e.g., service request fraud predictor 1574a), one or more service request/user prioritizers (e.g., service request/user prioritizer 1576a), etc.

An example embodiment of the service request cancellation predictor 1572a may be configurable or configured to prioritize and/or de-prioritize candidate service requests based on a likelihood of cancellation of the candidate service request (e.g., by the user who sent the candidate service request). For example, the service request cancellation predictor 1572a may be configurable to prioritize one or more candidate service requests that have been determined (or predicted, projected, estimated, or expected) to have a likelihood (or higher likelihood as compared to one or more other candidate service requests, identified service requests, other service requests, historic service requests, and/or a predetermined likelihood value) of being cancelled and/or abandoned if not matched based on the specified time period (as selected and/or generated by the time period selector 152, 152a). In such an example, those candidate service requests that are likely to be cancelled or abandoned if not matched pursuant to the specified time period may be prioritized (e.g., placed as a higher priority to be matched pursuant to the specified time period). As another example, an analysis may be performed for each candidate service request to determine (or predict, project, estimate, etc.) a maximum wait time before the candidate service request is likely to be cancelled and/or abandoned, and a prioritization may be provided to those candidate service requests based on the maximum wait time. In such an example, those candidate service requests having a maximum wait time that is equal to or less than twice (or more) of the specified time period may be prioritized (e.g., placed as a higher priority to be matched). In yet another example, the service request cancellation predictor 1572a may be configurable to de-prioritize one or more candidate service requests that have been determined (or predicted, projected, estimated, or expected) to have a likelihood (or higher likelihood as compared to one or more other candidate service requests, identified service requests, other service requests, historic service requests, and/or a predetermined likelihood value) of being cancelled and/or abandoned after being matched pursuant to the specified time period. In such an example, those candidate service requests that are likely to be cancelled or abandoned despite being matched pursuant to the specified time period may be de-prioritized (i.e., placed as a low priority to be matched pursuant to the specified time period).

An example embodiment of the service request fraud predictor 1574a may be configurable or configured to prioritize and/or de-prioritize candidate service requests based on likelihood that the candidate service request is associated with fraud. For example, the service request fraud predictor 1574a may be configurable to de-prioritize one or more candidate service requests that have been determined (or predicted or expected) to have a likelihood (or higher likelihood as compared to one or more other candidate service requests, identified service requests, other service requests, historic service requests, and/or a predetermined likelihood value) of being associated with fraud and/or fraudulent activities (e.g., stolen credit cards, etc.). In such an example, those candidate service requests that are likely to be associated with fraud and/or fraudulent activities may be de-prioritized (i.e., placed as a low priority to be matched pursuant to the specified time period) and those candidate service requests that are unlikely to be associated with fraud and/or fraudulent activities may be prioritized.

An example embodiment of the service request/user prioritizer 1576a may be configurable or configured to prioritize and/or de-prioritize candidate service requests based on one or more other criterion, such as those users of the service request having a new user status and/or special user status (e.g., VIP user, frequent user, loyal user, etc.). For example, the service request/user prioritizer 1576a may be configurable to prioritize one or more candidate service requests that have been determined to have a new user status and/or special user status. In such an example, those candidate service requests that have a new user status and/or special user status may be prioritized (i.e., placed as a priority to be matched pursuant to the specified time period).

Other considerations are also contemplated in the present disclosure, such as individual characteristics of the service request or user (e.g., how long has the user been active in using the transport-related service, how many service requests have been made (average, recently, total, per time period, rate—for example real time service request arrival rates, type of service, etc.), projected/estimated/predicted/expected future service requests, etc.), local circumstances (e.g., how much demand and/or supply has there been in the service request geographical region and/or service provider geographical region, projected/estimated/predicted/expected future demand and/or supply, etc.), recent circumstances (e.g., how recent and/or often has the user cancelled or been associated with fraud, projected/estimated/predicted/expected future cancellations and/or fraud by the user, etc.), historic trends (e.g., historic trends, such as cancellations and/or fraud, for the user, a group of users, service request geographical region, service provider geographical region, broader regions, etc.), etc.

Service Provider Prioritizer (e.g., Service Provider Prioritizer 157, 157b).

The processor 150 may include and/or perform one or more functionalities of one or more service provider prioritizers (e.g., service provider prioritizer 157, 157b). The service provider prioritizer 157, 157b may be configurable or configured to control, manage, and/or select service providers (e.g., for further processing by the matching processor 159) from among the candidate service providers selected by the candidate service provider selector 155, 155b. The service provider prioritizer 157, 157b may select such candidate service provider based on one or more criterion, such as likelihood of cancellation, likelihood of fraud, one or more other prioritization criterion, etc. As illustrated in FIG. 4, an example embodiment of the service provider prioritizer 157, 157b may include one or more service provider cancellation predictors (e.g., service provider cancellation predictor 1572b), one or more service provider fraud predictors (e.g., service provider fraud predictor 1574b), one or more service provider prioritizers (e.g., service provider prioritizer 1576b), etc.

An example embodiment of the service provider cancellation predictor 1572b may be configurable or configured to prioritize and/or de-prioritize candidate service providers based on a likelihood of cancellation by the candidate service provider. For example, the service provider cancellation predictor 1572b may be configurable to de-prioritize one or more candidate service providers that have been determined (or predicted, projected, estimated, or expected) to have a likelihood (or higher likelihood as compared to one or more other candidate service providers, identified service providers, other service providers, historic service providers, and/or a predetermined likelihood value) of cancelling and/or abandoning after being matched pursuant to the specified time period (as selected and/or generated by the time period selector 152, 152a). In such an example, those candidate service providers that are likely to cancel or abandon despite being matched pursuant to the specified time period may be de-prioritized (i.e., placed as a low priority to be matched pursuant to the specified time period).

An example embodiment of the service provider fraud predictor 1574b may be configurable or configured to prioritize and/or de-prioritize candidate service providers based on likelihood that the candidate service provider is associated with fraud. For example, the service provider fraud predictor 1574b may be configurable to de-prioritize one or more candidate service providers that have been determined (or predicted, projected, estimated, or expected) to have a likelihood (or higher likelihood as compared to one or more other candidate service providers, identified service providers, other service providers, historic service providers, and/or a predetermined likelihood value) of being associated with fraud and/or fraudulent activities (e.g., stolen credit cards, cheating users, theft, etc.). In such an example, those candidate service providers that are likely to be associated with fraud and/or fraudulent activities may be deprioritized (i.e., placed as a low priority to be matched pursuant to the specified time period).

An example embodiment of the service provider prioritizer 1576b may be configurable or configured to prioritize and/or de-prioritize candidate service providers based on one or more other factors, such as those service providers having a new service provider status and/or special service provider status (e.g., VIP service provider, loyal service provider, low activity status, etc.). For example, the service provider prioritizer 1576b may be configurable to prioritize one or more candidate service providers that have been determined to have a new service provider status and/or special service provider status. In such an example, those candidate service providers that have a new service provider status and/or special service provider status may be prioritized (i.e., placed as a priority to be matched pursuant to the specified time period).

Other considerations are also contemplated in the present disclosure, such as individual characteristics of the service provider (e.g., how long has the service provider been active in providing the transport-related service, how many service requests have been matched (average, recently, total, per time period, rate—for example real time service request arrival rates, type of service, etc.), projected/estimated/predicted/expected future matches to service requests, etc.), local circumstances (e.g., how much demand and/or supply has there been in the service request geographical region and/or service provider geographical region, projected/estimated/predicted/expected future demand and/or supply, etc.), recent circumstances (e.g., how recent and/or often has the service provider cancelled or been associated with fraud, projected/estimated/predicted/expected future cancellations and/or fraud by the service provider, etc.), historic trends (e.g., historic trends, such as cancellations and/or fraud, for the service provider, a group of service providers, service request geographical region, service provider geographical region, broader regions, etc.), etc. It is to be understood in the present disclosure that such service provider-related other considerations may also be used for service request-related processing, and vice versa.

In an example embodiment, a single prioritizer 517 may be configurable to perform the functions and operations of the service request prioritizer 157, 157a and service provider prioritizer 157, 157b. Alternatively or in addition, a plurality of prioritizers 157 may be configurable to perform the functions and operations of the service request prioritizer 157, 157*a* and service provider prioritizer 157, 157*b*.

Matching Processor (e.g., Matching Processor 159).

The processor 150 may include and/or perform one or more functionalities of one or more matching processors (e.g., matching processor 159). The matching processor 159 may be configurable or configured to control, manage, select, and/or match candidate or final service requests and candidate or final service providers. In performing the selection and matching of the candidate or final service requests and candidate or final service providers, the matching processor 159 may or may not dynamically adjust the service request geographical region (e.g., via and/or in cooperation with the service request geographical region selector 154). In addition to or in replacement, the matching processor 159 also may or may not dynamically adjust the service provider geographical region (e.g., via and/or in cooperation with the service provider geographical region selector 156). In addition to or in replacement, the matching processor 159 may or may not dynamically adjust the specified time period (e.g., via and/or in cooperation with the time period selector 152, 152*a*, and/or 152*b*).

Figure 5:
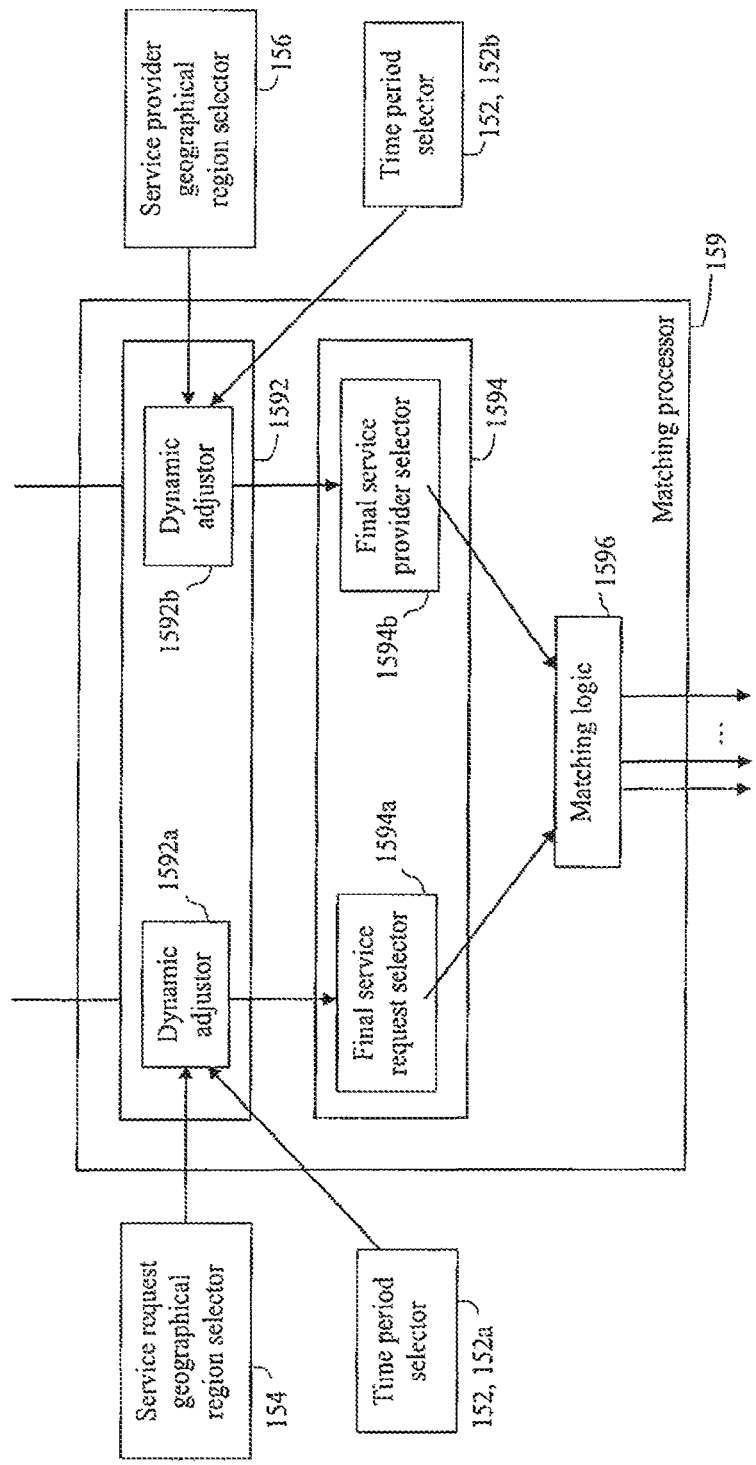
FIG. 5 is an illustration of an example embodiment of a matching processor.

As illustrated in FIG. 5, an example embodiment of the matching processor 159 may include a dynamic adjustor (e.g., dynamic adjustor 1592, which may include a service request dynamic adjustor 1592*a* and/or service provider dynamic adjustor 1592*b*) and a final selector (e.g., final selector 1594, which may include final service request selector 1594*a* and/or final service provider selector 1594*b*).

Example embodiments of the matching processor 159 may include or not include one or more of the elements and/or functionality described above and in the present disclosure, may include additional elements and/or functionality, may be formed and/or used in different sequences, actions, combinations, and/or configurations, and/or one or more of the elements and/or functionality (and/or elements of elements and/or functionality of elements) may be combinable into a single element, single functionality, divided into two or more elements, and/or divided into two or more functionalities. The matching processor 159, and elements and functionality thereof, will now be further explained with reference to the accompanying figures.

(i) Service Request Dynamic Adjustor (e.g., Service Request Dynamic Adjustor 1592, 1592*a*).

An example embodiment of the service request dynamic adjustor 1592, 1592*a* may be configurable or configured to cooperate with the service request geographical region selector 154 to dynamically generate and/or adjust the service request geographical region. Such dynamic generation and/or adjustment may be performed based on one or more criterion. For example, the dynamic generation and/or adjustment of the service request geographical region may be based on a quantity of the candidate service requests selected by the candidate service request selector 155, 155*a* and/or prioritized by the service request prioritizer 157, 157*a*. In such an example, when a quantity of the candidate service requests is high (or higher as compared to historic values, predetermined values, other regions, etc.), the service request geographical region may be reduced (e.g., made smaller by bringing inwards one or more boundary portions of the service request geographical region; divided into two or more smaller geographical regions; etc.). As another example, when a quantity of the candidate service requests is low (or lower as compared to historic values, predetermined values, other regions, etc.), the service request geographical region may be increased (e.g., expanded by pushing outwards one or more boundary portions of the service request geographical region; combining two or more service request geographical regions into one service request geographical region; etc.). In addition to or in replacement, the dynamic generation and/or adjustment may be performed based on a quantity of the candidate service providers selected by the candidate service provider selector 155, 155*b* and/or prioritized by the service provider prioritizer 157, 157*b*. For example, when a quantity of the candidate service providers is high (or higher as compared to historic values, predetermined values, other regions, etc.), the service request geographical region may be increased (e.g., expanded by pushing outwards one or more boundary portions of the service request geographical region; combining two or more service request geographical regions into one service request geographical region; etc.). As another example, when a quantity of the candidate service providers is low (or lower as compared to historic values, predetermined values, other regions, etc.), the service request geographical region may be reduced (e.g., made smaller by bringing inwards one or more boundary portions of the service request geographical region; divided into two or more smaller geographical regions; etc.). In addition to or in replacement, the dynamic generation and/or adjustment may be performed based on a distribution (e.g., density or density distribution) of the candidate service requests selected by the candidate service request selector 155, 155*a* and/or prioritized by the service request prioritizer 157, 157*a*. For example, when a density or density distribution of the candidate service requests is high (or higher as compared to historic values, predetermined values, other regions, etc.) in a particular part of the service request geographical region, that particular part of the service request geographical region may be reduced (e.g., made smaller by bringing inwards one or more boundary portions of the service request geographical region; divided into two or more smaller geographical regions; etc.) so as to have less candidate service requests to match with candidate service providers. As another example, when a density or density distribution of the candidate service requests is low (or lower as compared to historic values, predetermined values, other regions, etc.) in a particular part of the service request geographical region, that particular part of the service request geographical region may be increased (e.g., expanded by pushing outwards one or more boundary portions of the service request geographical region; combining two or more service request geographical regions into one service request geographical region; etc.) so as to have more candidate service requests to match with candidate service providers. In addition to or in replacement, the dynamic generation and/or adjustment may be performed based on a distribution (e.g., density or density distribution) of the candidate service providers selected by the candidate service provider selector 155, 155*b* and/or prioritized by the service provider prioritizer 157, 157*b*. For example, when a density or density distribution of the candidate service providers is high (or higher as compared to historic values, predetermined values, other regions, etc.) in a particular part of the service request geographical region, that particular part of the service request geographical region may be increased (e.g., expanded by pushing outwards one or more boundary portions of the service request geographical region; combining two or more service request geographical regions into one service request geographical region; etc.) so as to have more candidate service requests to match with candidate service providers. As another example, when a density or density distribution of the candidate service providers is low (or lower as compared to historic values, predetermined values, other regions, etc.)

in a particular part of the service request geographical region, that particular part of the service request geographical region may be reduced (e.g., made smaller by bringing inwards one or more boundary portions of the service request geographical region; divided into two or more smaller geographical regions; etc.) so as to have less candidate service requests to match with candidate service providers.

(ii) Service Provider Dynamic Adjustor (e.g., Service Provider Dynamic Adjustor 1592, 1592*b*).

An example embodiment of the service provider dynamic adjustor 1592, 1592*b* may be configurable or configured to cooperate with the service provider geographical region selector 156 to dynamically generate and/or adjust the service provider geographical region. Such dynamic generation and/or adjustment may be performed based on a quantity of the candidate service requests selected by the candidate service request selector 155, 155*a* and/or prioritized by the service request prioritizer 157, 157*a*. For example, when a quantity of the candidate service requests is high (or higher as compared to historic values, predetermined values, other regions, etc.), the service provider geographical region may be increased (e.g., expanded by pushing outwards one or more boundary portions of the service provider geographical region; combining two or more service provider geographical regions into one service provider geographical region; etc.). As another example, when a quantity of the candidate service requests is low (or lower as compared to historic values, predetermined values, other regions, etc.), the service request geographical region may be reduced (e.g., made smaller by bringing inwards one or more boundary portions of the service provider geographical region; divided into two or more smaller geographical regions; etc.). In addition to or in replacement, the dynamic generation and/or adjustment may be performed based on a quantity of the candidate service providers selected by the candidate service provider selector 155, 155*b* and/or prioritized by the service provider prioritizer 157, 157*b*. For example, when a quantity of the candidate service providers is high (or higher as compared to historic values, predetermined values, other regions, etc.), the service provider geographical region may be reduced (e.g., made smaller by bringing inwards one or more boundary portions of the service provider geographical region; divided into two or more smaller geographical regions; etc.). As another example, when a quantity of the candidate service providers is low (or lower as compared to historic values, predetermined values, other regions, etc.), the service provider geographical region may be increased (e.g., expanded by pushing outwards one or more boundary portions of the service provider geographical region; combining two or more service provider geographical regions into one service provider geographical region; etc.). In addition to or in replacement, the dynamic generation and/or adjustment may be performed based on a distribution (e.g., density or density distribution) of the candidate service requests selected by the candidate service request selector 155, 155*a* and/or prioritized by the service request prioritizer 157, 157*a*. For example, when a density or density distribution of the candidate service requests is high (or higher as compared to historic values, predetermined values, other regions, etc.) in a particular part of the service provider geographical region, that particular part of the service provider geographical region may be increased (e.g., expanded by pushing outwards one or more boundary portions of the service provider geographical region, combining two or more service provider geographical regions into one service provider geographical region, etc.) so as to have candidate service requests to match with more candidate service providers. As another example, when a density or density distribution of the candidate service requests is low (or lower as compared to historic values, predetermined values, other regions, etc.) in a particular part of the service provider geographical region, that particular part of the service provider geographical region may be reduced (e.g., made smaller by bringing inwards one or more boundary portions of the service provider geographical region; divided into two or more smaller geographical regions; etc.). In addition to or in replacement, the dynamic generation and/or adjustment may be performed based on a distribution (e.g., density or density distribution) of the candidate service providers selected by the candidate service provider selector 155, 155*b* and/or prioritized by the service provider prioritizer 157, 157*b*. For example, when a density or density distribution of the candidate service providers is high (or higher as compared to historic values, predetermined values, other regions, etc.) in a particular part of the service provider geographical region, that particular part of the service provider geographical region may be reduced (e.g., made smaller by bringing inwards one or more boundary portions of the service provider geographical region; divided into two or more smaller geographical regions; etc.). As another example, when a density or density distribution of the candidate service providers is low (or lower as compared to historic values, predetermined values, other regions, etc.) in a particular part of the service provider geographical region, that particular part of the service provider geographical region may be increased (e.g., expanded by pushing outwards one or more boundary portions of the service provider geographical region; combining two or more service provider geographical regions into one service provider geographical region; etc.).

An example embodiment of the dynamic adjustor 1592, 1592*a*, 1592*b* may be configurable or configured to cooperate with the service request time period selector 152, 152*a* and/or service provider time period selector 152, 152*b* to dynamically generate and/or adjust the specified time period selected and/or generated for service request and/or service provider processing. Such dynamic generation and/or adjustment may be performed based on a quantity of the candidate service requests (e.g., selected by the candidate service request selector 155, 155*a* and/or prioritized by the service request prioritizer 157, 157*a*), such as a quantity relative to a threshold service request number. For example, when a quantity of the candidate service requests exceeds a threshold service request number (e.g., a high threshold service request number), the specified time period for the service request selection may be reduced (e.g., made smaller in time, divided into two or more smaller time periods, etc.). As another example, when a quantity of the candidate service requests does not exceed a threshold service request number (e.g., a low threshold service request number), the specified time period for the service request selection may be increased (e.g., expanded in time, combining two or more time periods, etc.). In addition to or in replacement, the dynamic generation and/or adjustment may be performed based on a quantity of the candidate service providers (e.g., selected by the candidate service provider selector 155, 155*b* and/or prioritized by the service provider prioritizer 157, 157*b*), such as a quantity relative to a threshold service provider number. For example, when a quantity of the candidate service providers exceeds a threshold service provider number (e.g., a high threshold service provider number), the specified time period for the service provider selection may be reduced (e.g., made smaller in time, divided into two or more time periods, etc.). As another example, when a quantity of the candidate service providers does not exceed a threshold service provider number (e.g., a low threshold service provider number), the specified time period for the service provider selection may be increased (e.g., expanded in time, combining two or more time periods, etc.).

In an example embodiment, a single dynamic adjustor 1592 may be configurable to perform the functions and operations of the service request dynamic adjustor 1592, 1592*a* and service provider dynamic adjustor 1592, 1592*b*. Alternatively or in addition, a plurality of dynamic adjustors 1592 may be configurable to perform the functions and operations of the service request dynamic adjustor 1592, 1592*a* and service provider dynamic adjustor 1592, 1592*b*.

(iii) Final Service Request Selector (e.g., Final Service Request Selector 1594, 1594*a*).

An example embodiment of the final service request selector 1594, 1594*a* may be configurable or configured to select one or more final service requests from among the plurality of candidate service requests selected by the candidate service request selector 155, 155*a*. Such selection by the final service request selector 1594, 1594*a* may be responsive to the actions performed by, among other elements, the prioritizer 157, 157*a* and/or the dynamic adjustor 1592, 1592*a*. For example, the selection of the one or more final service requests may be responsive to a prioritization by the service request cancellation predictor 1572, 1572*a*. Alternatively or in addition, the selection of the one or more final service requests may be responsive to a prioritization by the service request fraud predictor 1574, 1574*a*. Alternatively or in addition, the selection of the one or more final service requests may be responsive to a prioritization by the service request/user prioritizer 1576, 1576*a*.

Alternatively or in addition, the selection of the one or more final service requests may be responsive to a dynamic adjustment of the service request geographical region, service provider geographical region, and/or specified time period for the service request processing and/or service provider processing.

(iv) Final Service Provider Selector (e.g., Final Service Provider Selector 1594, 1594*b*).

An example embodiment of the final service provider selector 1594, 1594*b* may be configurable or configured to select one or more final service providers from among the plurality of candidate service providers selected by the candidate service provider selector 155, 155*b*. Such selection by the final service provider selector 1594, 1594*b* may be responsive to the actions performed by, among other elements, the prioritizer 157, 157*b* and/or the dynamic adjustor 1592, 1592*b*. For example, the selection of the one or more final service providers may be responsive to a prioritization by the service provider cancellation predictor 1572, 1572*b*. Alternatively or in addition, the selection of the one or more final service providers may be responsive to a prioritization by the service provider fraud predictor 1574, 1574*b*. Alternatively or in addition, the selection of the one or more final service providers may be responsive to a prioritization by the service provider prioritizer 1576, 1576*b*. Alternatively or in addition, the selection of the one or more final service providers may be responsive to a dynamic adjustment of the service request geographical region, service provider geographical region, and/or specified time period for the service request processing and/or service provider processing.

In an example embodiment, a single final selector 1594 may be configurable to perform the functions and operations of the final service request selector 1594, 1594*a* and final service provider selector 1594, 1594*b*. Alternatively or in addition, a plurality of final selectors 1594 may be configurable to perform the functions and operations of the final service request selector 1594, 1594*a* and final service provider selector 1594, 15924

(v) Matching Logic or Matcher (e.g., Matching Logic 1596).

An example embodiment of the matching logic or matcher 1596 may be configurable or configured to match each final service request selected by the final service request selector 1594, 1594*a* to a final service provider selected by the final service provider selector 1594, 1594*b*. Such matching by the matching logic 1596 may be performed based on one or more criterion, such as distance, time, traffic conditions, road directions, construction areas, day of the year, day of the week, time of the day, holidays, historic statistics, and/or future predictions. For example, the matching of each final service request to a final service provider may be based on a calculation, for some or all possible matches, of the total and/or average (or mean, median, etc.) distance travelled by the final service providers to reach the location (e.g., current location, initial location, origin location, starting location, etc.) of the final service requests. In such an example, the matching selected by the matching logic 1596 may be the matching that results in the lowest total and/or average (or mean, median, etc.) distance. As another example, the matching of each final service request to a final service provider may be based on a calculation, for some or all possible matches, of the total and/or average (or mean, median, etc.) estimated, projected, predicted, and/or expected time it would take for the final service providers to reach the location (e.g., current location, initial location, origin location, starting location, etc.) of the final service requests. In such an example, the matching selected by the matching logic 1596 may be the matching that results in the lowest total and/or average (or mean, median, etc.) time. Other conditions and/or considerations for performing the matching in addition to or in replacement of distance and/or time are also contemplated without departing from the teachings of the present disclosure.

Method of Managing Transport-Related Service Requests Based on a Likelihood of Cancellation.

Figures 6A, 6B:
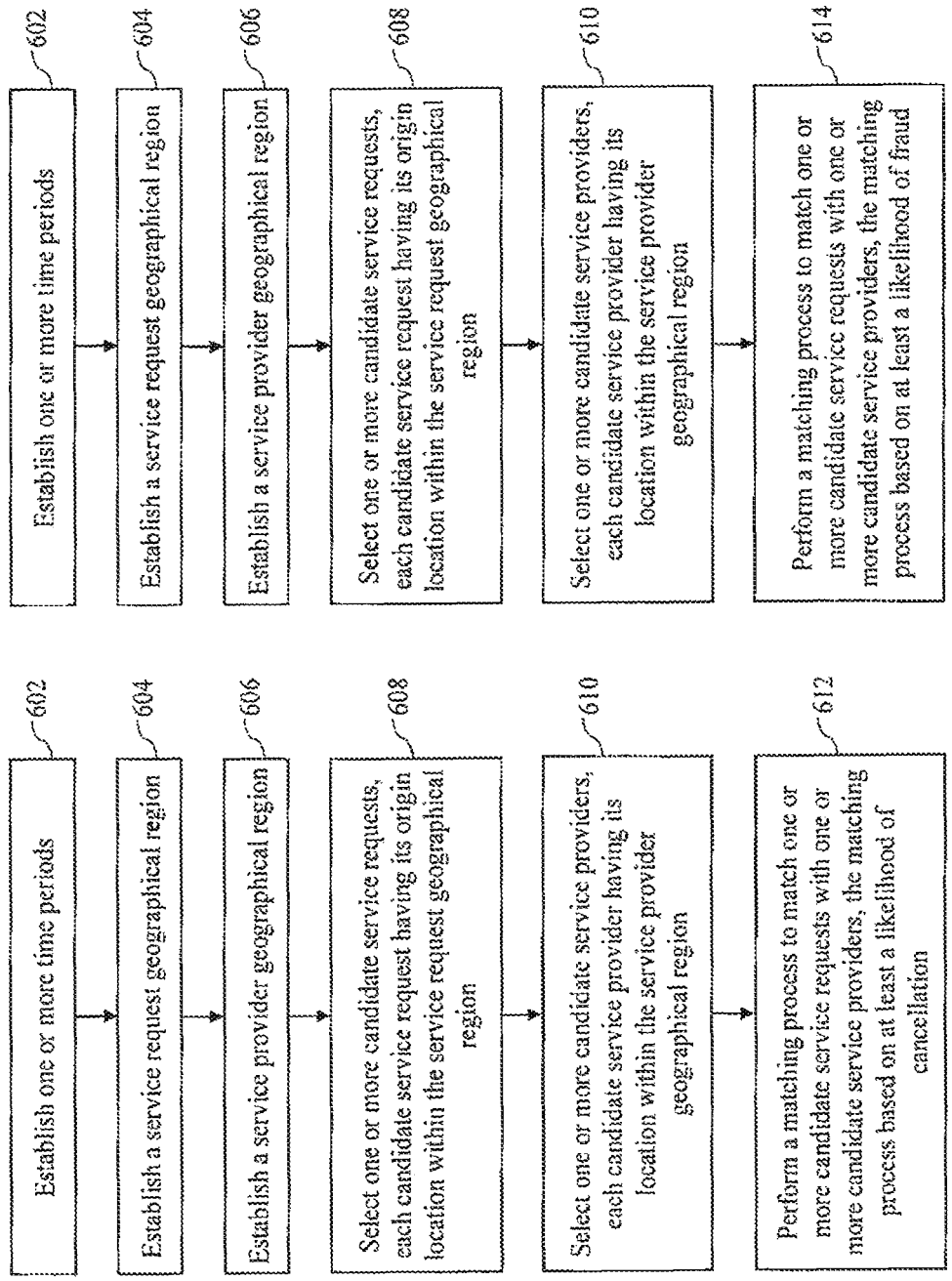
FIG. 6A is an illustration of an example embodiment of a method of managing service requests based on a likelihood of cancellation.
FIG. 6B is an illustration of an example embodiment of a method of managing service requests based on a likelihood of fraud.

As illustrated in FIG. 6A, an example embodiment of a method of managing transport-related service requests may be based on, among other things, a likelihood of cancellation. The method may include establishing, selecting, and/or generating one or more time periods (e.g., a specified time period or first time period referred to in the present disclosure) (e.g., action 602). The one or more time periods may include a time period for service request-related processing and a time period for service provider-related processing. The time period for service request-related processing and service provider-related processing may be the same or different. The method may also include identifying one or more service requests received during the time period. Each identified service request may include an origin location (which may be a current location, initial location, starting location, desired location, etc.). The method may also include identifying one or more service providers from among a plurality of service providers. Each of the identified service providers may have a current service provider location and an availability status. Each identified service provider may have its availability status indicating that it is currently available (or will be available) to be matched with a service request. The method may also include establishing, selecting, and/or generating a service request geographical region (e.g., action 604). The method may also include establishing, selecting, and/or generating a service provider geographical region (e.g., action 606). The service request geographical region and the service provider geographical region may be the same or different. The method may also include selecting one or more candidate service requests from among identified service requests (e.g., action 608). Each candidate service request may have its origin location (which may be a current location, initial location, starting location, desired location, etc.) within the service request geographical region. The method may also include selecting one or more candidate service providers from among identified service providers (e.g., action 610). Each candidate service provider may have its current service provider location (and/or projected, predicted, expected, and/or estimated location) within the service provider geographical region. The method may also include performing a matching process to match one or more of the candidate service requests with one or more of the candidate service providers. The matching process may be based on at least a likelihood that a cancellation will occur (e.g., action 612).

For example, prior to the matching process, the method may first identify one or more (or a subset) of the selected candidate service requests. The identified one or more candidate service requests may include those selected candidate service requests having a likelihood of being cancelled or abandoned if not matched in the current matching process (e.g., not matched pursuant to or based on the current time period). Once identified, the matching process may prioritize a matching for the one or more selected candidate service requests. As a more specific example, a selected candidate service request may be associated with a user (or user account) who has previously cancelled, abandoned, and/or has a history of cancelling or abandoning a service request if a match is not found within a particular amount of time (e.g., 9 seconds). Such particular amount of time may be an actual, condition-based (e.g., time-specific, day-specific, location-specific, service type-specific, etc.), average, mean, predicted, projected, estimated, and/or expected amount of time for the selected candidate service request (e.g., such particular amount of time may be based on one or more criterion, such as day, time, location, type of service, etc.). If such particular amount of time (e.g., 9 seconds) is greater than the amount of time required to provide a match to the user based on the current matching process (e.g., a current or specified time period of 5 seconds and time required to transmit and display a notification on the user's computing device of 1 second) but less than (or equal to) a total or overall amount of time required to perform the first matching process, a second or subsequent matching process, and provide a match to the user (i.e., display on the user's computing device) based on the second matching process (e.g., a total or overall amount of time of 5 seconds+5 seconds+1 second, or 11 seconds), such selected candidate service request may be identified and prioritized (or given a higher priority as compared to the other selected candidate service requests) for receiving a match pursuant to the current matching process.

As another example, prior to the matching process, the method may first determine, for each selected candidate service request, a maximum wait time. The maximum wait time may be a projected, predicted, estimated, and/or expected amount of time (i.e., the user who sent the selected candidate service request) may wait until the user cancels and/or abandons the selected candidate service request. Such maximum wait time may be based on one or more criterion, such as day, time, location, type of service, etc. Thereafter, the matching process may prioritize a matching for at least one of the selected candidate service requests based on the maximum wait time.

As another example, prior to the matching process, the method may first identify one or more (or a subset) of the selected candidate service requests. The identified one or more candidate service requests may include those selected candidate service requests having a likelihood of being cancelled or abandoned after and/or despite being matched with one of the candidate service providers in the current matching process. Once identified, the matching process may de-prioritize a matching for the one or more candidate service requests. As a more specific example, a selected candidate service request may be associated with a user (or user account) who has previously cancelled, abandoned, and/or has a history of cancelling or abandoning a service request if a match is not found within a particular amount of time (e.g., 4 seconds) and/or even if a match is found. Such particular amount of time may be an actual, condition-based (e.g., time-specific, day-specific, location-specific, service type-specific, etc.), average, mean, predicted, projected, estimated, and/or expected amount of time for the selected candidate service request (e.g., such particular amount of time may be based on one or more criterion, such as day, time, location, type of service, etc.). If such particular amount of time (e.g., 4 seconds) is less than the amount of time required to provide a match to the user based on the current matching process (e.g., a current or specified time period of 5 seconds and time required to transmit and display a notification on the user's computing device of 1 second), such selected candidate service request may be identified and de-prioritized (or given a lower priority as compared to the other selected candidate service requests) for receiving a match pursuant to the current matching process.

As another example, prior to the matching process, the method may first identify one or more (or a subset) of the selected candidate service providers. The identified one or more candidate service providers may include those candidate service providers having a likelihood of cancelling after or despite being matched with one of the candidate service requests in the current matching process. Once identified, the matching process may de-prioritize (or give a lower priority as compared to the other selected candidate service providers) a matching for the one or more candidate service providers.

In yet another example, prior to the matching process, the method may first identify one or more possible matches between the selected candidate service providers and selected candidate service requests. The identified possible matches may be some or all possible matches between the selected candidate service provider and selected candidate service requests. Once some or all possible matches are identified, the method may further include selecting (for de-prioritizing) one or more such possible matches based on a likelihood that such a match may be cancelled by the selected candidate service provider and/or user who sent the selected candidate service request. The matching process may then de-prioritize the matching of such selected matches. As an illustrative example, a selected candidate service provider may (or may not) have a history or tendency of cancelling after (or before) being matched to a service request. However, in a situation where the method determines that such a selected candidate service provider may, based on one or more considerations and/or criterion pertaining to such a match (e.g., traffic conditions that will be encountered to reach the service request or user, distance to make a U-turn in order to reach the service request, other visual indications by the candidate service provider, etc.), have a likelihood of cancelling, the method may de-prioritize such a matching of such candidate service providers to such candidate service requests. In addition to or alternatively, in a situation where the method determines that such a user of the selected candidate service request may, based on one or more considerations and/or criterion pertaining to such a match (e.g., traffic conditions that the candidate service provider will encounter to reach the user, distance the candidate service provider needs to travel to make a U-turn to reach the user, etc.), have a likelihood of cancelling, the method may deprioritize such a matching of such candidate service providers to such candidate service requests.

Method of Managing Transport-Related Service Requests Based on a Likelihood of Fraud.

As illustrated in FIG. 6B, an example embodiment of a method of managing transport-related service requests may be based on, among other things, a likelihood of fraud or an occurrence of a fraudulent activity. The method may include establishing, selecting, and/or generating one or more time periods (e.g., a specified time period or first time period referred to in the present disclosure) (e.g., action 602). The one or more time periods may include a time period for service request-related processing and a time period for service provider-related processing. The time period for service request-related processing and service provider-related processing may be the same or different. The method may also include identifying one or more service requests received during the time period. Each identified service request may include an origin location (which may be a current location, initial location, starting location, desired location, etc.). The method may also include identifying one or more service providers from among a plurality of service providers. Each of the identified service providers may have a current service provider location and an availability status. Each identified service provider may have its availability status indicating that it is currently available (or will be available) to be matched with a service request. The method may also include establishing, selecting, and/or generating a service request geographical region (e.g., action 604). The method may also include establishing, selecting, and/or generating a service provider geographical region (e.g., action 606). The service request geographical region and the service provider geographical region may be the same or different. The method may also include selecting one or more candidate service requests from among identified service requests (e.g., action 608). Each candidate service request may have its origin location (which may be a current location, initial location, starting location, desired location, etc.) within the service request geographical region. The method may also include selecting one or more candidate service providers from among identified service providers (e.g., action 610). Each candidate service provider may have its current service provider location (and/or projected, predicted, expected, and/or estimated location) within the service provider geographical region. The method may also include performing a matching process to match one or more of the candidate service requests with one or more of the candidate service providers. The matching process may be based on at least a likelihood of being associated with fraud (e.g., action 614).

For example, prior to the matching process, the method may first identify one or more (or a subset) of the selected candidate service requests. The identified one or more candidate service requests may include those selected candidate service requests having a likelihood of being associated with fraud. Once identified, the matching process may de-prioritize (or give a lower priority as compared to the other selected candidate service requests) a matching for the one or more candidate service requests. Examples of a service request having a likelihood of being associated with fraud includes a service request having a user account associated with or having previously associated with a stolen or lost credit card, incorrect or fake information, etc.

As another example, prior to the matching process, the method may first identify one or more (or a subset) of the selected candidate service providers. The identified one or more candidate service providers may include those selected candidate service providers having a likelihood of being associated with fraud. Once identified, the matching process may de-prioritize (or give a lower priority as compared to the other selected candidate service providers) a matching for the one or more candidate service providers.

Method of Managing Transport-Related Service Requests Based on a Service Request and/or Service Provider Prioritization.

Figure 6C:
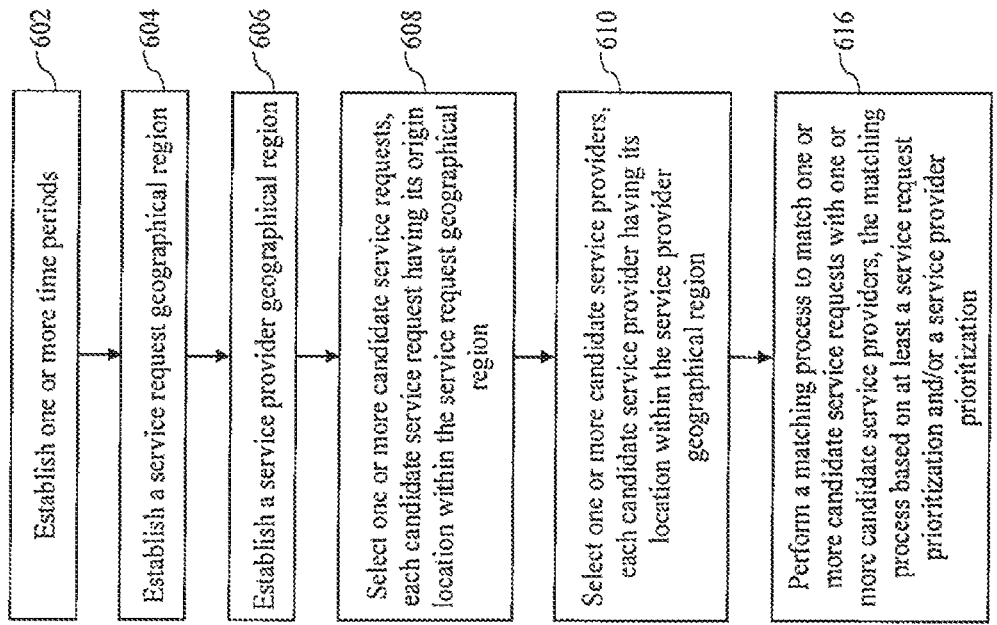
FIG. 6C is an illustration of an example embodiment of a method of managing service requests based on a service request prioritization and/or service provider prioritization.

As illustrated in FIG. 6C, an example embodiment of a method of managing transport-related service requests may be based on, among other things, candidate service requests having a prioritized status. The method may include establishing, selecting, and/or generating one or more time periods (e.g., a specified time period or first time period referred to in the present disclosure) (e.g., action 602). The one or more time periods may include a time period for service request-related processing and a time period for service provider-related processing. The time period for service request-related processing and service provider-related processing may be the same or different. The method may also include identifying one or more service requests received during the time period. Each identified service request may include an origin location (which may be a current location, initial location, starting location, desired location, etc.). The method may also include identifying one or more service providers from among a plurality of service providers. Each of the identified service providers may have a current service provider location and an availability status. Each identified service provider may have its availability status indicating that it is currently available (or will be available) to be matched with a service request. The method may also include establishing, selecting, and/or generating a service request geographical region (e.g., action 604). The method may also include establishing, selecting, and/or generating a service provider geographical region (e.g., action 606). The service request geographical region and the service provider geographical region may be the same or different. The method may also include selecting one or more candidate service requests from among identified service requests (e.g., action 608). Each candidate service request may have its origin location (which may be a current location, initial location, starting location, desired location, etc.) within the service request geographical region. The method may also include selecting one or more candidate service providers from among identified service providers (e.g., action 610). Each candidate service provider may have its current service provider location (and/or projected, predicted, expected, and/or estimated location) within the service provider geographical region. The method may also include performing a matching process to match one or more of the candidate service requests with one or more of the candidate service providers. The matching process may be based on at least a prioritized status associated with one or more of the candidate service requests (e.g., action 616).

For example, prior to the matching process, the method may first identify one or more (or a subset) of the selected candidate service requests. The identified one or more candidate service requests may include those selected candidate service requests associated with or having a prioritized status. Once identified, the matching process may prioritize (or given a higher priority as compared to the other selected candidate service requests) a matching for the one or more candidate service requests. Examples of a service request having a prioritized status includes a service request having a user account that has a new user status, a special user status (e.g., VIP, premium, or paid member), frequent user status, etc.

As another example, prior to the matching process, the method may first identify one or more (or a subset) of the selected candidate service providers. The identified one or more candidate service providers may include those selected candidate service providers associated with or having a prioritized status. Once identified, the matching process may prioritize (or given a higher priority as compared to the other selected candidate service providers) a matching for the one or more candidate service providers. Examples of a service provider having a prioritized status include a service provider having a new service provider status, special service provider status (loyalty, etc.), low activity status, etc.

Method of Managing Transport-Related Service Requests Based on Dynamically Generating or Adjusting a Service Request Geographical Region.

Figure 6D:
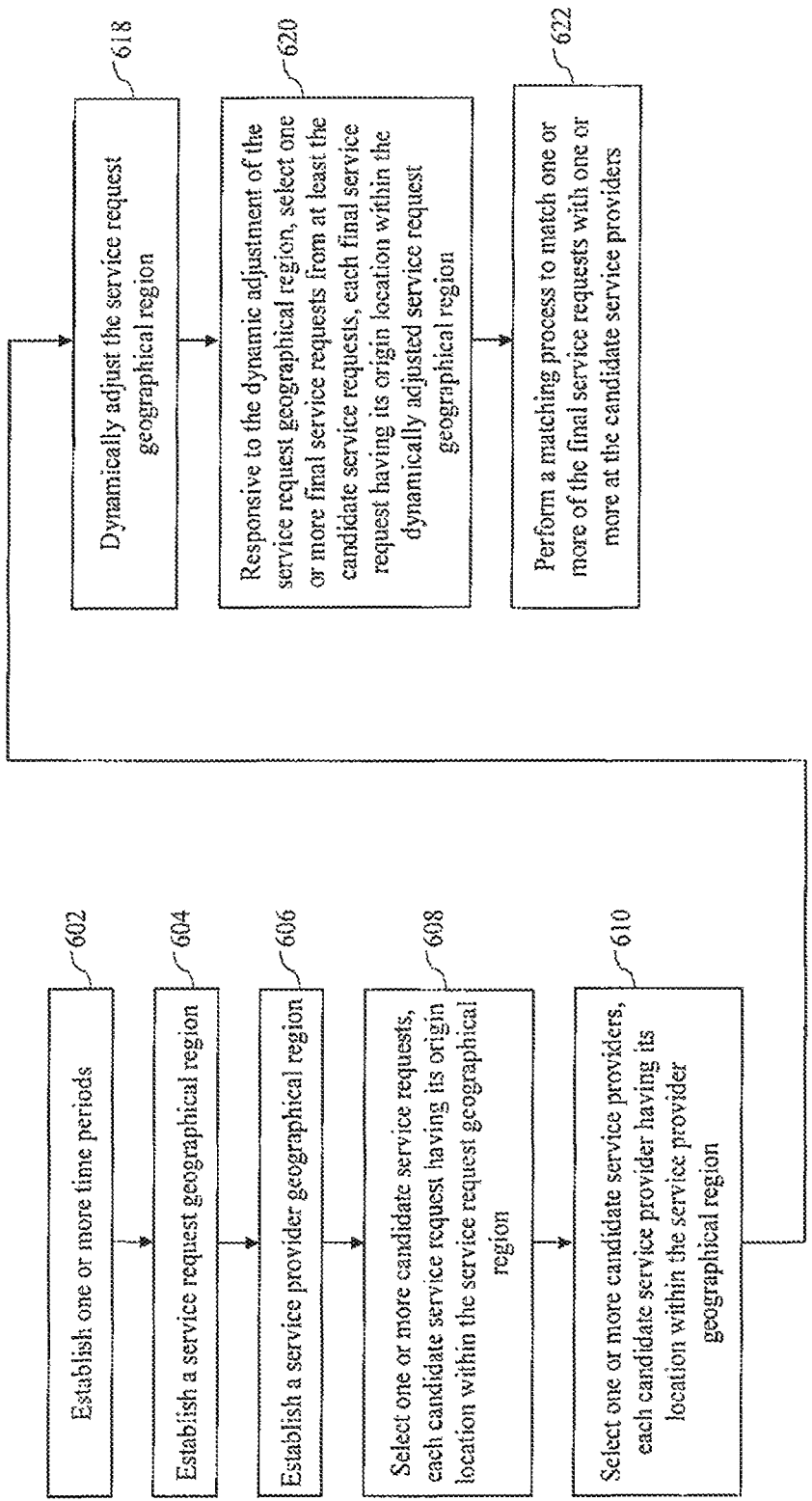
FIG. 6D is an illustration of an example embodiment of a method of managing service requests based on dynamically adjusting the service request geographical region.

As illustrated in FIG. 6D, an example embodiment of a method of managing transport-related service requests may be based on, among other things, dynamically generating and/or adjusting a service request geographical region. The method may include establishing, selecting, and/or generating one or more time periods (e.g., a specified time period or first time period referred to in the present disclosure) (e.g., action 602). The one or more time periods may include a time period for service request-related processing and a time period for service provider-related processing. The time period for service request-related processing and service provider-related processing may be the same or different. The method may also include identifying one or more service requests received during the time period. Each identified service request may include an origin location (which may be a current location, initial location, starting location, desired location, etc.). The method may also include identifying one or more service providers from among a plurality of service providers. Each of the identified service providers may have a current service provider location and an availability status. Each identified service provider may have its availability status indicating that it is currently available (or will be available) to be matched with a service request. The method may also include establishing, selecting, and/or generating a service request geographical region (e.g., action 604). For example, the service request geographical region may be dynamically generated based on one or more criterion, as described in the present disclosure. The method may also include establishing, selecting, and/or generating a service provider geographical region (e.g., action 606). For example, the service provider geographical region may be dynamically generated based on one or more criterion, as described in the present disclosure. The service request geographical region and the service provider geographical region may be the same or different. The method may also include selecting one or more candidate service requests from among identified service requests (e.g., action 608). Each candidate service request may have its origin location (which may be a current location, initial location, starting location, desired location, etc.) within the service request geographical region. The method may also include selecting one or more candidate service providers from among identified service providers (e.g., action 610). Each candidate service provider may have its current service provider location (and/or projected, predicted, expected, and/or estimated location) within the service provider geographical region. The method may also include dynamically adjusting the service request geographical region (e.g., action 618) based on a quantity of the selected candidate service requests, a quantity of the selected candidate service providers, a distribution of the selected candidate service requests within the service request geographical region, and/or a distribution of the selected candidate service providers within the service provider geographical region. The method may also include, responsive to the dynamic adjustment of the service request geographical region, selecting one or more final service requests from at least the candidate service requests (e.g., action 620). Each final service request may have its origin location (which may be a current location, initial location, starting location, desired location, etc.) within the dynamically adjusted service request geographical region. The method may also include performing a matching process to match one or more of the final service requests with one or more of the candidate service providers (e.g., action 622).

Method of Managing Transport-Related Service Requests Based on Dynamically Generating or Adjusting a Service Provider Geographical Region.

Figure 6E:
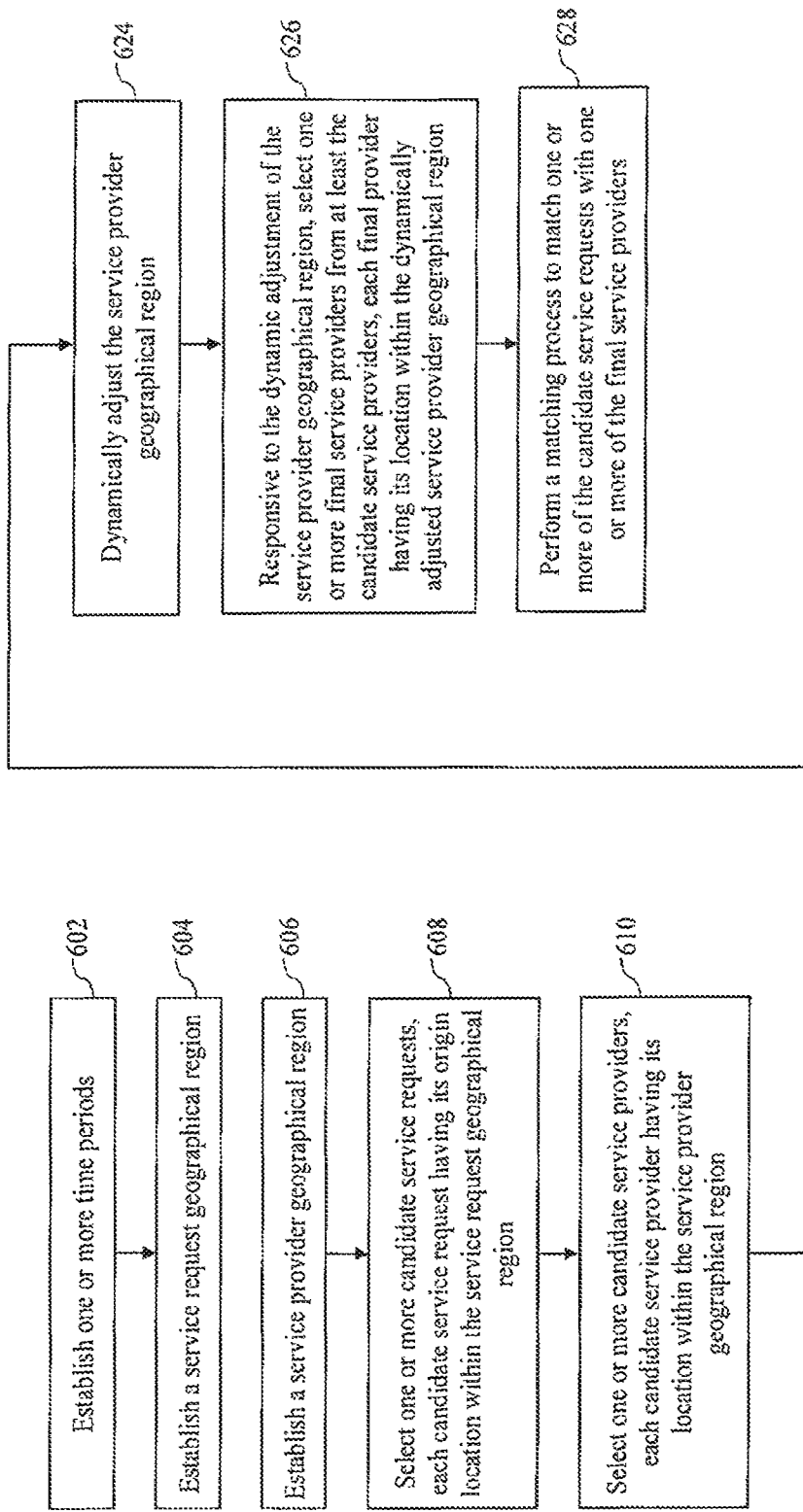
FIG. 6E is an illustration of an example embodiment of a method of managing service requests based on dynamically adjusting the service provider geographical region.

As illustrated in FIG. 6E, an example embodiment of a method of managing transport-related service requests may be based on, among other things, dynamically generating and/or adjusting a service provider geographical region. The method may include establishing, selecting, and/or generating one or more time periods (e.g., a specified time period or first time period referred to in the present disclosure) (e.g., action 602). The one or more time periods may include a time period for service request-related processing and a time period for service provider-related processing. The time period for service request-related processing and service provider-related processing may be the same or different. The method may also include identifying one or more service requests received during the time period. Each identified service request may include an origin location (which may be a current location, initial location, starting location, desired location, etc.). The method may also include identifying one or more service providers from among a plurality of service providers. Each of the identified service providers may have a current service provider location and an availability status. Each identified service provider may have its availability status indicating that it is currently available (or will be available) to be matched with a service request. The method may also include establishing, selecting, and/or generating a service-request geographical region (e.g., action 604). For example, the service request geographical region may be dynamically generated based on one or more criterion, as described in the present disclosure. The method may also include establishing, selecting, and/or generating a service provider geographical region (e.g., action 606). For example, the service provider geographical region may be dynamically generated based on one or more criterion, as described in the present disclosure. The service request geographical region and the service provider geographical region may be the same or different. The method may also include selecting one or more candidate service requests from among identified service requests (e.g., action 608). Each candidate service request may have its origin location (which may be a current location, initial location, starting location, desired location, etc.) within the service request geographical region. The method may also include selecting one or more candidate service providers from among identified service providers (e.g., action 610). Each candidate service provider may have its current service provider location (and/or projected, predicted, expected, and/or estimated location) within the service provider geographical region. The method may also include dynamically adjusting the service provider geographical region (e.g., action 624) based on a quantity of the selected candidate service requests, a quantity of the selected candidate service providers, a distribution of the selected candidate service requests within the service request geographical region, and/or a distribution of the selected candidate service providers within the service provider geographical region. The method may also include, responsive to the dynamic adjustment of the service provider geographical region, selecting one or more final service providers from at least the candidate service providers (e.g., action 626). Each final service provider may have its current service provider location (which may be a current location, initial location, starting location, projected location, etc.) within the dynamically adjusted service provider geographical region. The method may also include performing a matching process to match one or more of the candidate service requests with one or more of the final service providers (e.g., action 628).

Method of Managing Transport-Related Service Requests Based on Dynamically Generating or Adjusting a Time Period.

Figure 6F:
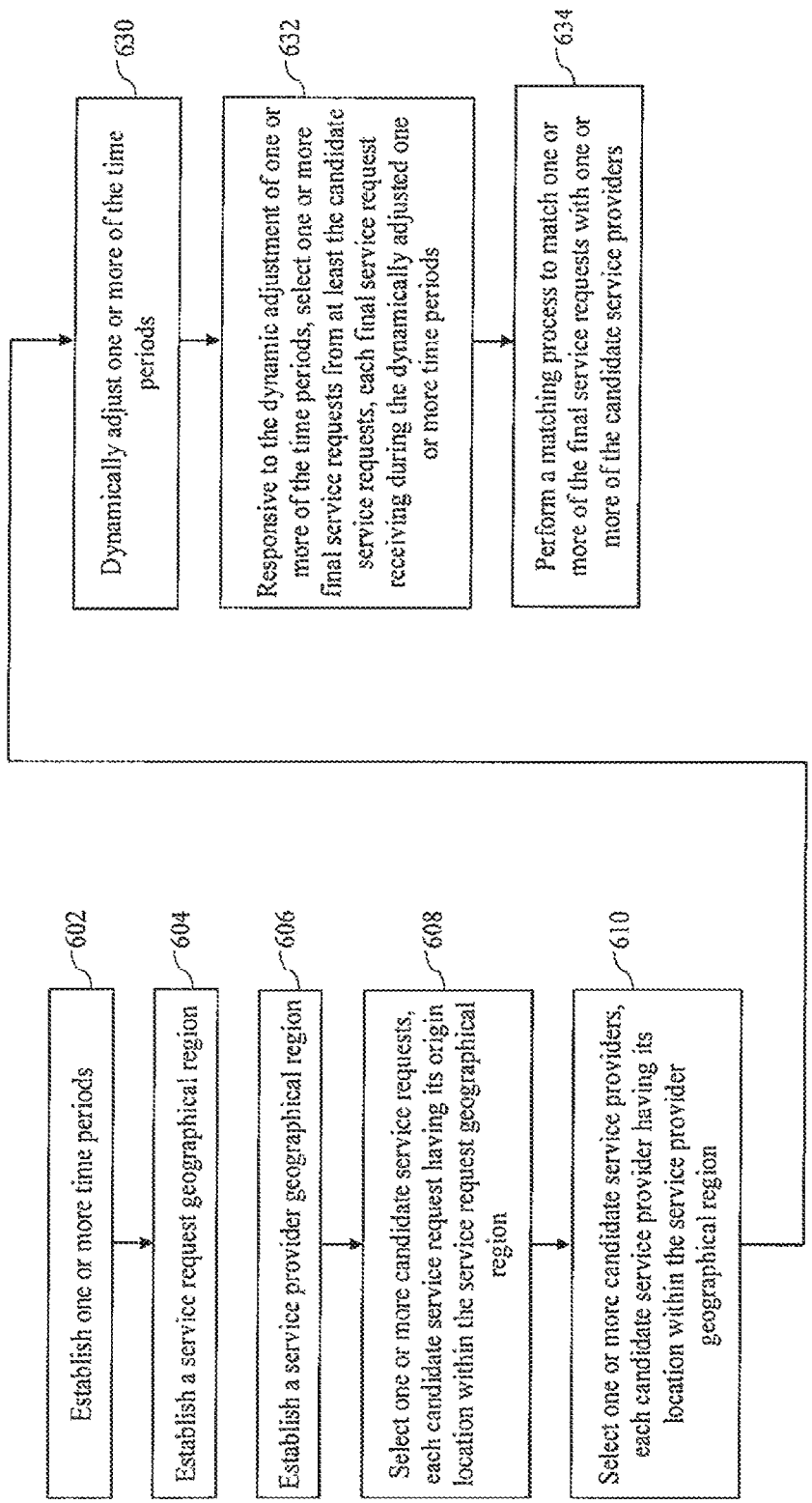
FIG. 6F is an illustration of an example embodiment of a method of managing service requests based on dynamically adjusting a time period associated with service request-related processing and/or a time period associated with service provider-related processing.
Figure 6G:
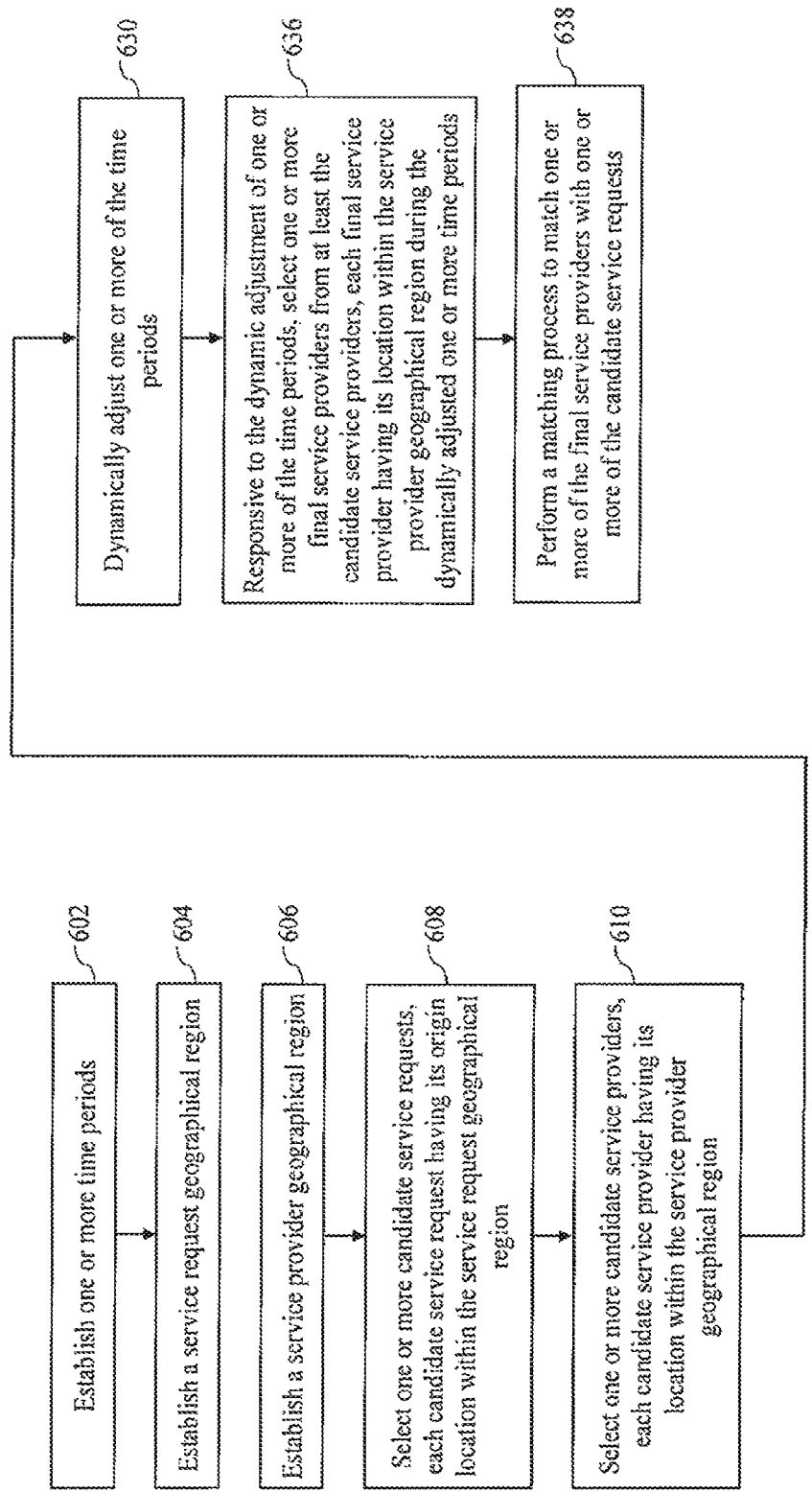
FIG. 6G is an illustration of another example embodiment of a method of managing service requests based on dynamically adjusting a time period associated with service request related processing and/or a time period associated with service provider-related processing.

As illustrated in FIG. 6F and FIG. 6G, an example embodiment of a method of managing transport-related service requests may be based on, among other things, dynamically generating and/or adjusting a time period. The method may include establishing, selecting, and/or generating one or more time periods (e.g., a specified time period or first time period referred to in the present disclosure) (e.g., action 602). The one or more time periods may include e a time period for service request-related processing and a time period for service provider-related processing. For example, the one or more time periods may be dynamically generated based on one or more criterion, as described in the present disclosure. The time period for service request-related processing and service provider-related processing may be the same or different. The method may also include identifying one or more service requests received during the time period. Each identified service request may include an origin location (which may be a current location, initial location, starting location, desired location, etc.). The method may also include identifying one or more service providers from among a plurality of service providers. Each of the identified service providers may have a current service provider location and an availability status. Each identified service provider may have its availability status indicating that it is currently available (or will be available) to be matched with a service request. The method may also include establishing, selecting, and/or generating a service request geographical region (e.g., action 604). For example, the service request geographical region may be dynamically generated based on one or more criterion, as described in the present disclosure. The method may also include establishing, selecting, and/or generating a service provider geographical region (e.g., action 606). For example, the service provider geographical region may be dynamically generated based on one or more criterion, as described in the present disclosure. The service request geographical region and the service provider geographical region may be the same or different. The method may also include selecting one or more candidate service requests from among identified service requests (e.g., action 608). Each candidate service request may have its origin location (which may be a current location, initial location, starting location, desired location, etc.) within the service request geographical region. The method may also include selecting one or more candidate service providers from among identified service providers (e.g., action 610). Each candidate service provider may have its current service provider location (and/or projected, predicted, expected, and/or estimated location) within the service provider geographical region. The method may also include dynamically adjusting one or more of the time periods (e.g., action 630) for service request-related processing and/or service provider-related processing based on a quantity of the selected candidate service requests (e.g., relative to a threshold service request number) and/or a quantity of the selected candidate service providers (e.g., relative to a threshold service provider number). The method may also include, responsive to the dynamic adjustment of the time period for service request-related processing and/or service provider-related processing, selecting one or more final service requests from at least the candidate service requests (e.g., action 632 in FIG. 6F). Each final service request may be a service request received during the dynamically adjusted time period. The method may also include, responsive to the dynamic adjustment of the time period for service related processing and/or service provider-related processing, selecting one or more final service providers from at least the candidate service providers (e.g., action 636 in FIG. 6G). Each final service provider may be a service provider having its location or project location within the service provider geographical location during the dynamically adjusted time period. The method may also include performing a matching process to match one or more of the candidate and/or final service requests with one or more of the candidate and/or final service providers (e.g., action 634 in FIG. 6F or action 638 in FIG. 6G).

Method of Managing Transport-Related Service Requests Based on a Plurality of Considerations.

An example embodiment of a method of managing transport-related service requests may be based on a plurality of considerations. For example, two or more of the example method embodiments may be combined, in part or in whole, to manage transport-related service requests. For example, the method of managing transport-related service requests may be based on a likelihood that a cancellation and fraud will occur. As another example, the method of managing transport-related service requests may be based on dynamically generating and/or adjusting the service request geographical region, dynamically generating and/or adjusting the service provider geographical region, and a likelihood that a cancellation and fraud will occur. In yet another example, the method of managing transport-related service requests may be based on dynamically generating and/or adjusting the service request geographical region, dynamically generating and/or adjusting the service provider geographical region, dynamically generating and/or adjusting the specified time period, and a likelihood that a cancellation and fraud will occur.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, "communication," "communicate," "connection," "connect," "call," "calling," or other similar terms should generally be construed broadly to mean a wired, wireless, and/or other form of, as applicable, connection between elements, devices, computing devices, telephones, processors, controllers, servers, networks, telephone networks, the cloud, and/or the like, which enable voice and/or data to be sent, transmitted, broadcasted, received, intercepted, acquired, and/or transferred (each as applicable).

Also, as referred to herein, a processor, device, computing device, telephone, phone, server, gateway server, communication gateway server, and/or controller, may be any processor, computing device, and/or communication device, and may include a virtual machine, computer, node, instance, host, or machine in a networked computing environment. Also as referred to herein, a network or cloud may be or include a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

Database (or memory or storage) may comprise any collection and/or arrangement of volatile and/or non-volatile components suitable for storing data. For example, memory may comprise random access memory (RAM) devices, read-only memory (ROM) devices, magnetic storage devices, optical storage devices, solid state devices, and/or any other suitable data storage devices. In particular embodiments, database may represent, in part, computer-readable storage media on which computer instructions and/or logic are encoded. Database may represent any number of memory components within, local to, and/or accessible by a processor and/or computing device.

Various terms used herein have special meanings within the present technical field. Whether a particular term should be construed as such a "term of art" depends on the context in which that term is used. Such terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A processor device for managing a plurality of transport-related service requests, the processor device having a CPU cooperating with an input device and an output device, under control of stored instructions, to perform the following steps:
   receive, from a plurality of requesters, service requests at the input device;
   buffer the service requests until a batch creation criterion is met, to thereby generate a batch of service requests;
   access stored service provider data to identify available service providers from among a pool of service providers;
   when the batch creation criterion is met:
      perform a matching process to endeavour to match each service request of the batch of service requests to a service provider; and
      recommence buffering service requests for generation of a subsequent batch of service requests; and
      for each service provider to whom a match is made, transmit a notification of the respective potential match for acceptance or rejection by the service provider.

2. A processor device of claim 1, wherein the batch creation criterion is one of reaching a predetermined threshold number and the elapsing of a dynamically variable time period.

3. The processor device of claim 2, wherein the processor is further configured to vary the time period according to data traffic load.

4. The processor device of claim 1, further configured, after the matching process, to add an unmatched service request of the batch of service requests to a later batch of service requests for a further round of matching.

5. The processor device of claim 4, further configured to:
   determine if the unmatched service request has been unmatched for more than a threshold number of matching attempts; and responsive thereto, reject the unmatched service request.

6. The processor device of claim 1, wherein the matching process is performed to establish an optimised matching across the batch of service requests.

7. A method of managing a plurality of transport-related service requests, by means of a processor device having a CPU cooperating with an input device and an output device, under control of stored instructions, the method comprising:
   receiving, from a plurality of requesters, service requests at the input device; buffering the service requests until a batch creation criterion is met, to thereby generate a batch of service requests;
   accessing stored service provider data to identify available service providers from among a pool of service providers;
   when the batch creation criterion is met:
      performing a matching process to endeavour to match each service request of the batch of service requests to a service provider; and
      recommencing buffering service requests for generation of a subsequent batch of service requests; and for each service provider to whom a match is made, transmitting a notification of the respective potential match to the service provider.

8. The method of claim 7, wherein the batch creation criterion is one of reaching a predetermined threshold number and the elapsing of a dynamically variable time period.

9. The method of claim 8, further comprising varying the time period to control the number of service requests in a batch.

10. The method of claim 8, further comprising varying a geographical area from which service requests are received to control the number of service requests in a batch.

11. The method of claim 10, wherein varying the geographical area comprises: pre-partitioning the geographical area into partitions; determining a live request load in each partition; and forming a batch when the total of live request loads in adjacent partitions reaches the predetermined threshold number.

12. The method of claim 11, wherein the partitions are nodes in a tree structure, and wherein forming the batch comprises re-combining child nodes into their parent node.

13. The method of claim 8, comprising dynamically establishing the time period, a service request geographical region, and/or a service provider geographical region based on one or more of: a consideration of historic request volumes; real time service request arrival rates; and a consideration of historic availability status.

14. The method of claim 7, further comprising, after the matching process, adding an unmatched service request of the batch of service requests to a later batch of service requests for a further round of matching.

15. The method of claim 14, further comprising: determining if the unmatched service request has been unmatched for more than a threshold number of matching attempts; and responsive thereto, rejecting the unmatched service request.

16. The method of claim 7, comprising assigning priorities to service requests, and performing the matching process on the basis of the priority of each service request.

17. The method of claim 7, comprising assigning priorities to service providers, and performing the matching process on the basis of the priority of each service provider.

18. The method of claim 7, comprising performing the matching process based on at least a likelihood that one or more of the group comprising a cancellation and fraud will occur.

19. A non-transitory computer-readable medium having instructions stored thereon that, when executed by one or more processors, cause the one or more processors to carry out a method of managing a plurality of transport-related service requests, the method comprising:
receiving, from a plurality of requesters, service requests at an input device of the one or more processors;
buffering the service requests until a batch creation criterion is met, to thereby generate a batch of service requests;
accessing stored service provider data to identify available service providers from among a pool of service providers;
when the batch creation criterion is met:
performing a matching process to endeavour to match each service request of the batch of service requests to a service provider; and
recommencing buffering service requests for generation of a subsequent batch of service requests; and
for each service provider to whom a match is made, transmitting a notification of the respective potential match to the service provider.

20. The non-transitory computer-readable medium of claim 19, wherein the batch creation criterion is one of reaching a predetermined threshold number and the elapsing of a dynamically variable time period.

* * * * *